(12) United States Patent
Wagner et al.

(10) Patent No.: US 12,180,005 B2
(45) Date of Patent: *Dec. 31, 2024

(54) SYSTEMS AND METHODS FOR PROCESSING OBJECTS, INCLUDING AUTOMATED PROCESSING STATIONS

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,940

(22) Filed: Oct. 30, 2023

(65) Prior Publication Data
US 2024/0208732 A1 Jun. 27, 2024

Related U.S. Application Data

(63) Continuation of application No. 18/120,687, filed on Mar. 13, 2023, now Pat. No. 11,866,261, which is a
(Continued)

(51) Int. Cl.
*B65G 1/137* (2006.01)
*B65G 43/00* (2006.01)

(52) U.S. Cl.
CPC .......... *B65G 1/1376* (2013.01); *B65G 43/00* (2013.01); *B65G 2201/0235* (2013.01)

(58) Field of Classification Search
CPC .................. B65G 1/1376; B65G 43/00; B65G 2201/0235
See application file for complete search history.

(56) References Cited

U.S. PATENT DOCUMENTS

| 4,722,653 A | 2/1988 | Williams et al. |
| 4,759,439 A | 7/1988 | Hartlepp |

(Continued)

FOREIGN PATENT DOCUMENTS

| CA | 3096656 C | 11/2023 |
| CN | 1033604 A | 7/1989 |

(Continued)

OTHER PUBLICATIONS

Communication pursuant to Article 94(3) EPC issued by the European Patent Office in related European Patent Application No. 18759792.7 on Mar. 29, 2023, 8 pages.
(Continued)

*Primary Examiner* — Kyle O Logan
(74) *Attorney, Agent, or Firm* — Gesmer Updegrove LLP

(57) ABSTRACT

A processing system for processing objects using a programmable motion device is disclosed. The processing system a perception unit for perceiving identifying indicia representative of an identity of an object associated with an input conveyance system, and an acquisition system for acquiring the object from a plurality of objects at an input area using an end effector of the programmable motion device, wherein the programmable motion device is adapted for assisting in
(Continued)

the delivery of the object to an identified processing location. The identified processing location being associated with the identifying indicia and said identified processing location being provided as one of a plurality of processing locations. The processing system also includes a delivery system for receiving the object in a carrier and for delivering the object toward the identified processing location.

29 Claims, 26 Drawing Sheets

Related U.S. Application Data continuation of application No. 17/077,199, filed on Oct. 22, 2020, now Pat. No. 11,634,282, which is a continuation of application No. 16/742,166, filed on Jan. 14, 2020, now Pat. No. 10,870,538, which is a continuation of application No. 15/971,087, filed on May 4, 2018, now Pat. No. 10,583,986.

(56) References Cited

U.S. PATENT DOCUMENTS

| | | | |
|---|---|---|---|
| 4,846,335 A | 7/1989 | Hartlepp | |
| 4,895,242 A | 1/1990 | Michel | |
| 4,963,251 A | 10/1990 | Böhm et al. | |
| 5,190,162 A | 3/1993 | Hartlepp | |
| 5,595,263 A | 1/1997 | Pignataro | |
| 5,839,566 A | 11/1998 | Bonnet | |
| 5,979,633 A | 11/1999 | Bonnet | |
| 6,079,570 A | 6/2000 | Oppliger et al. | |
| 6,189,702 B1 | 2/2001 | Bonnet | |
| 6,208,908 B1* | 3/2001 | Boyd | G06Q 10/087 198/704 |
| 6,246,023 B1 | 6/2001 | Kugle | |
| 6,323,452 B1 | 11/2001 | Bonnet | |
| 6,499,604 B1 | 12/2002 | Kitson | |
| 6,505,093 B1 | 1/2003 | Thatcher et al. | |
| 6,688,459 B1 | 2/2004 | Bonham et al. | |
| 6,762,382 B1 | 7/2004 | Danelski | |
| 6,897,395 B2 | 5/2005 | Shiibashi et al. | |
| 7,887,130 B1 | 2/2011 | Zvolena | |
| 8,682,484 B2* | 3/2014 | Bellante | G05B 19/4182 700/214 |
| 8,776,694 B2 | 7/2014 | Rosenwinkel et al. | |
| 9,102,336 B2 | 8/2015 | Rosenwinkel | |
| 9,364,865 B2 | 6/2016 | Kim | |
| 9,481,518 B2 | 11/2016 | Neiser | |
| 9,751,693 B1 | 9/2017 | Battles et al. | |
| 9,878,349 B2 | 1/2018 | Crest et al. | |
| 9,926,138 B1 | 3/2018 | Brazeau et al. | |
| 9,931,673 B2* | 4/2018 | Nice | B07C 1/02 |
| 9,962,743 B2 | 5/2018 | Bombaugh et al. | |
| 10,127,514 B2* | 11/2018 | Napoli | G06Q 10/083 |
| 10,138,062 B2* | 11/2018 | High | B25J 9/0093 |
| 10,870,538 B2 | 12/2020 | Wagner et al. | |
| 11,219,311 B1 | 1/2022 | Kondziela | |
| 2002/0092801 A1 | 7/2002 | Dominguez | |
| 2002/0113365 A1 | 8/2002 | Britton et al. | |
| 2003/0038065 A1 | 2/2003 | Pippin et al. | |
| 2004/0195320 A1 | 10/2004 | Ramsager | |
| 2007/0209976 A1 | 9/2007 | Worth et al. | |
| 2008/0277243 A1 | 11/2008 | Hayduchok et al. | |
| 2011/0094854 A1 | 4/2011 | Hayduchok et al. | |
| 2011/0144798 A1 | 6/2011 | Freudelsperger | |
| 2011/0150612 A1 | 6/2011 | Gruber et al. | |
| 2011/0238207 A1 | 9/2011 | Bastian, II et al. | |
| 2011/0243707 A1 | 10/2011 | De La Ballina Freres | |
| 2014/0244026 A1* | 8/2014 | Neiser | B65G 1/1378 700/216 |
| 2014/0364998 A1 | 12/2014 | Neiser et al. | |
| 2015/0081090 A1 | 3/2015 | Dong | |
| 2016/0083197 A1 | 3/2016 | Otto | |
| 2016/0221762 A1 | 8/2016 | Schroader | |
| 2016/0347545 A1 | 12/2016 | Lindbo et al. | |
| 2017/0080566 A1 | 3/2017 | Stubbs et al. | |
| 2017/0121113 A1* | 5/2017 | Wagner | G06V 20/64 |
| 2017/0157649 A1 | 6/2017 | Wagner et al. | |
| 2017/0349385 A1* | 12/2017 | Moroni | B07C 1/06 |
| 2018/0085788 A1 | 3/2018 | Engel et al. | |
| 2018/0127219 A1 | 5/2018 | Wagner et al. | |
| 2018/0327198 A1 | 11/2018 | Wagner et al. | |
| 2019/0322454 A1 | 10/2019 | Wan et al. | |
| 2019/0337723 A1 | 11/2019 | Wagner et al. | |
| 2020/0130951 A1 | 4/2020 | Wagner et al. | |
| 2020/0148476 A1 | 5/2020 | Wagner et al. | |
| 2021/0039140 A1 | 2/2021 | Geyer et al. | |
| 2021/0039888 A1 | 2/2021 | Wagner et al. | |
| 2023/0183006 A1 | 6/2023 | Wolff et al. | |
| 2023/0219762 A1 | 7/2023 | Wagner et al. | |

FOREIGN PATENT DOCUMENTS

| | | |
|---|---|---|
| CN | 1671489 A | 9/2005 |
| CN | 102390701 A | 3/2012 |
| CN | 110691742 A | 1/2020 |
| CN | 112105573 A | 12/2020 |
| CN | 115258630 A | 11/2022 |
| DE | 102007038834 A1 | 2/2009 |
| EP | 613841 A1 | 9/1994 |
| EP | 2233400 A1 | 9/2010 |
| JP | S54131278 A | 10/1979 |
| JP | 2002028577 A | 1/2002 |
| JP | 2008037567 A | 2/2008 |
| WO | 2007009136 A1 | 1/2007 |
| WO | 2010017872 A1 | 2/2010 |
| WO | 2010099873 A1 | 9/2010 |
| WO | 2011038442 A2 | 4/2011 |
| WO | 2012024714 A2 | 3/2012 |
| WO | 2018176033 A1 | 9/2018 |
| WO | 2019212584 A1 | 11/2019 |

OTHER PUBLICATIONS

Communication pursuant to Rules 161(1) and 162 EPC issued by the European Patent Office in related European Patent Application No. 18759792.7 on Dec. 11, 2020, 3 pages.

Examiner's Report issued by the Innovation, Science and Economic Development Canada (Canadian Intellectual Property Office) in related Canadian Patent Application No. 3,096,656 on Jan. 24, 2022, 3 pages.

International Preliminary Report on Patentability issued by the International Bureau of WIPO in related International Application PCT/US2018/045484 mailed Nov. 19, 2020, 9 pages.

International Search Report and Written Opinion issued by the International Searching Authority, the European Patent Office, in related International Patent Application PCT/US2018/045484 mailed Jan. 31, 2019, 12 pages.

Non-Final Office Action issued by the United States Patent and Trademark Office in related U.S. Appl. No. 17/077,199, filed Aug. 16, 2022, 11 pages.

Non-Final Office Action issued by the United States Patent and Trademark Office in related U.S. Appl. No. 18/120,687, filed Jun. 30, 2023, 9 pages.

Notice on Second Office Action issued in related Chinese Application No. 201880093132.X by the China National Intellectual Property Administration on Feb. 28, 2022, 8 pages.

Notice on the First Office Action issued in related Chinese Application No. 201880093132.X by the China National Intellectual Property Administration on Aug. 4, 2021, 37 pages.

U.S. Office Action issued in related U.S. Appl. No. 15/971,087 mailed Jun. 25, 2019, 11 pages.

* cited by examiner

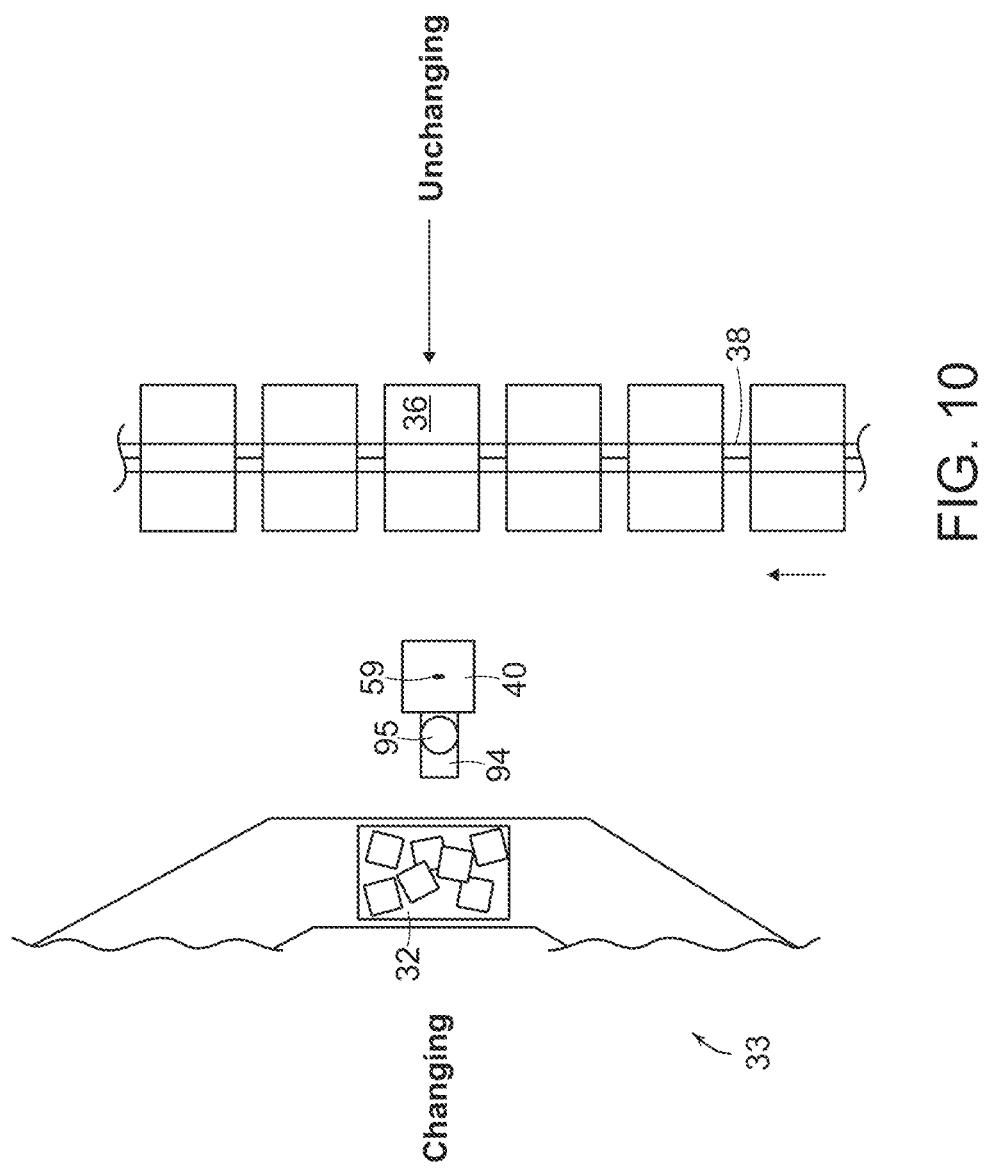

SYSTEMS AND METHODS FOR PROCESSING OBJECTS, INCLUDING AUTOMATED PROCESSING STATIONS

PRIORITY

The present application is a continuation of and claims priority to U.S. patent application Ser. No. 18/120,687, filed Mar. 13, 2023, which is a continuation of U.S. patent application Ser. No. 17/077,199, filed Oct. 22, 2020, now U.S. Pat. No. 11,634,282, issued Apr. 25, 2023, which is a continuation of U.S. patent application Ser. No. 16/742,166, filed Jan. 14, 2020, now U.S. Pat. No. 10,870,538, issued Dec. 22, 2020, which is a continuation of U.S. patent application Ser. No. 15/971,087, filed May 4, 2018, now issued as U.S. Pat. No. 10,583,986, on Mar. 10, 2020, the disclosures of which are hereby incorporated by reference in their entireties.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, consumer products etc.) be processed and moved to a number of processing destinations.

Many object distribution systems, for example, receive objects in a disorganized stream or bulk transfer that may be provided as individual objects or objects aggregated in groups such as in bags, arriving on any of several different conveyances, commonly a conveyor, a truck, a pallet a Gaylord, or a bin etc. Each object must then be distributed to the correct destination location (e.g., a container) as determined by identification information associated with the object, which is commonly determined by a label printed on the object. The destination location may take many forms, such as a bag, a shelf, a container, or a bin.

The processing (e.g., sortation or distribution) of such objects has traditionally been done, at least in part, by human workers that scan the objects, for example with a hand-held barcode scanner, and then place the objects at assigned locations. Many order fulfillment operations, for example, achieve high efficiency by employing a process called wave picking. In wave picking, orders are picked from warehouse shelves and placed at locations (e.g., into bins) containing multiple orders that are sorted downstream. At the sorting stage, individual articles are identified, and multi-article orders are consolidated, for example, into a single bin or shelf location, so that they may be packed and then shipped to customers. The process of sorting these articles has traditionally been done by hand. A human sorter picks an article, and then places the article in the so-determined bin or shelf location where all articles for that order or manifest have been defined to belong. Automated systems for order fulfillment have also been proposed. See, for example, U.S. Patent Application Publication No. 2014/0244026, which discloses the use of a robotic arm together with an arcuate structure that is movable to within reach of the robotic arm.

The identification of objects by code scanning generally either require manual processing, or require that the code location be controlled or constrained so that a fixed or robot-held code scanner (e.g., a barcode scanner) can reliably detect the code. Manually operated barcode scanners are therefore generally either fixed or handheld systems. With fixed systems, such as those at point-of-sale systems, the operator holds the article and places it in front of the scanner, which scans continuously, and decodes any barcodes that it can detect. If the article's code is not immediately detected, the person holding the article typically needs to vary the position or orientation of the article with respect to the fixed scanner, so as to render the barcode more visible to the scanner. For handheld systems, the person operating the scanner may look at the barcode on the article, and then hold the article such that the barcode is within the viewing range of the scanner, and then press a button on the handheld scanner to initiate a scan of the barcode.

Further, many distribution center sorting systems generally assume an inflexible sequence of operation whereby a disorganized stream of input objects is provided (by a human) as a singulated stream of objects that are oriented with respect to a scanner that identifies the objects. An induction element or elements (e.g., a conveyor, a tilt tray, or manually movable bins) transport the objects to desired destination locations or further processing stations, which may be a bin, a chute, a bag or a conveyor etc.

In conventional object sortation or distribution systems, human workers or automated systems typically retrieve objects in an arrival order, and sort each object or objects into a collection bin based on a set of given heuristics. For example, all objects of a like-type might be directed to a particular collection bin, or all objects in a single customer order, or all objects destined for the same shipping destination, etc. may be directed to a common destination location. Generally, the human workers, with the possible limited assistance of automated systems, are required to receive objects and to move each to their assigned collection bin. If the number of different types of input (received) objects is large, then a large number of collection bins is required.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store, and a second set of break-pack store packages may go to a second store. In this way, the system may accept large volumes of product from a manufacturer, and then re-package the objects into break-packs to be provided to retail stores at which a wide variety of objects are to be provided in a specific controlled distribution fashion.

Such a system however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely on human labor to some extent. Most solutions rely on a worker that is performing sortation, by scanning each object from an induction area (chute, table, etc.) and placing each object at a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a processing system for processing objects using a programmable motion device. The processing system includes a perception unit for perceiving identifying indicia representative of an identity of an object associated with an input conveyance system, and an acquisition system for acquiring the object from a plurality of objects at an input area using an end effector of the programmable motion device, wherein the programmable motion device is adapted for assisting in the delivery of the object to an identified processing location. The identified processing location being associated with the identifying indicia and said identified processing location being provided as one of a plurality of processing locations. The processing system also includes a delivery system for receiving the object in a carrier and for delivering the object toward the identified processing location.

In accordance with another embodiment, the invention provides a processing system for processing objects using a programmable motion device, where the processing system includes a perception unit for perceiving identifying indicia representative of an identity of a plurality of objects associated with an input conveyance system, an acquisition system for acquiring an object from the plurality of objects at an input area using an end effector of the programmable motion device, wherein the programmable motion device is adapted for assisting in the delivery of the object to an identified processing location, said identified processing location being associated with the identifying indicia and said identified processing location being provided as one of a plurality of processing locations, and a delivery system for delivering the object to the identified processing location, said delivery system including a plurality of carriers that travel in a loop, any of which carriers may contain the object.

In accordance with a further embodiment, the invention provides a method of processing objects using a programmable motion device. This includes the steps of perceiving identifying indicia representative of an identity of a plurality of objects associated with an input conveyance system, acquiring an object from the plurality of objects at an input area using an end effector of the programmable motion device, wherein the programmable motion device is adapted for assisting in the delivery of the object to an identified processing location, the identified processing location being associated with the identifying indicia and the identified processing location being provided as one of a plurality of processing locations, and delivering the object toward the identified processing location, the step of delivering the object toward the identified processing location including receiving the object in a carrier.

BRIEF DESCRIPTION OF THE DRAWINGS

The following description may be further understood with reference to the accompanying drawings in which:

FIG. 10 shows an illustrative diagrammatic top view of an object processing system in accordance with another embodiment of the invention that identifies changing and unchanging motion planning general areas;

The drawings are shown for illustrative purposes only.

DETAILED DESCRIPTION

In accordance with an embodiment, the invention provides processing systems for processing objects using a programmable motion device. The processing system includes a perception unit for perceiving identifying indicia representative of an identify of an object associated with an input conveyance system. The processing system also includes an acquisition system for acquiring the object from a plurality of objects at an input area using an end effector of the programmable motion device. The programmable motion device is adapted for assisting in the delivery of the object to an identified processing location, and the identified processing location is associated with the identifying indicia. The identified processing location is also provided as one of a plurality of processing locations. The processing system also includes a delivery system for receiving the object on a carrier and for delivering the object toward the identified processing location.

Generally, individual parcels need to be identified and conveyed to desired parcel specific locations. The systems reliably automate the identification and conveyance of such parcels, employing in certain embodiments, a set of conveyors, a perception system, and a plurality of destination bins. In short, applicants have discovered that when automating sortation of objects, there are a few main things to consider: 1) the overall system throughput (parcels sorted per hour), 2) the number of diverts (i.e., number of discrete locations to which an object can be routed), 3) the total area of the sortation system (square feet), and 4) the capital and annual costs to purchase and run the system.

Sorting objects in a parcel distribution center is one application for automatically identifying and sorting objects. In a shipping distribution center, parcels commonly arrive in trucks, are conveyed to sortation stations where they are sorted according to desired destinations, aggregated in bags and then loaded in trucks for transport to the desired destinations. Another application would be in the shipping department of a retail store or order fulfillment center, which may require that parcels be sorted for transport to different shippers, or to different distribution centers of a particular shipper In a shipping or distribution center, the desired destination is commonly obtained by reading identifying information printed on the parcel or on an attached label. In this scenario, the destination corresponding to identifying information is commonly obtained by querying the customer's information system. In other scenarios, the destination may be written directly in the parcel, or may be known through other means.

Figure 1:
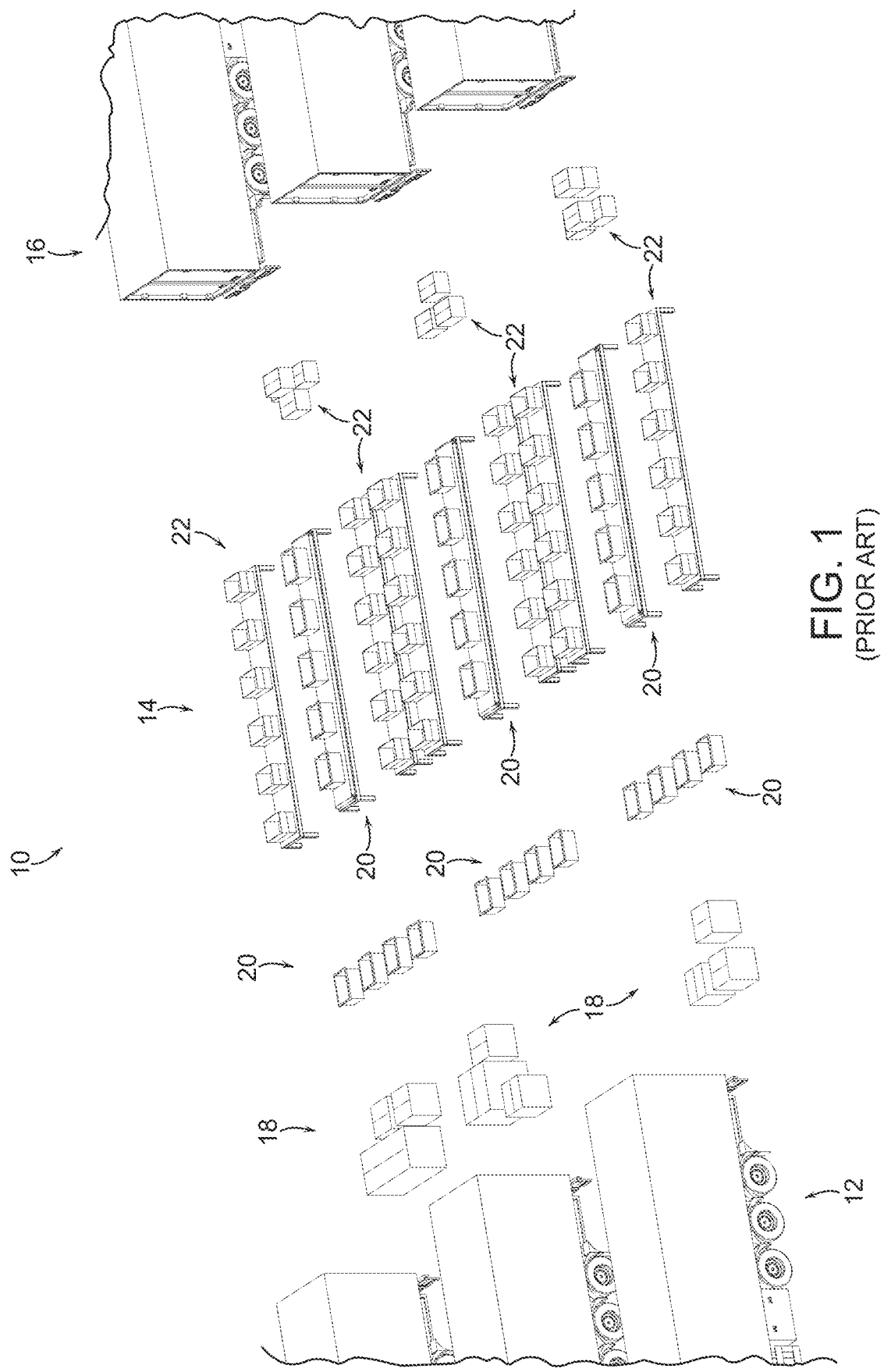
FIG. 1 shows an illustrative diagrammatic view of an object processing system of the prior art.
Figure 2:
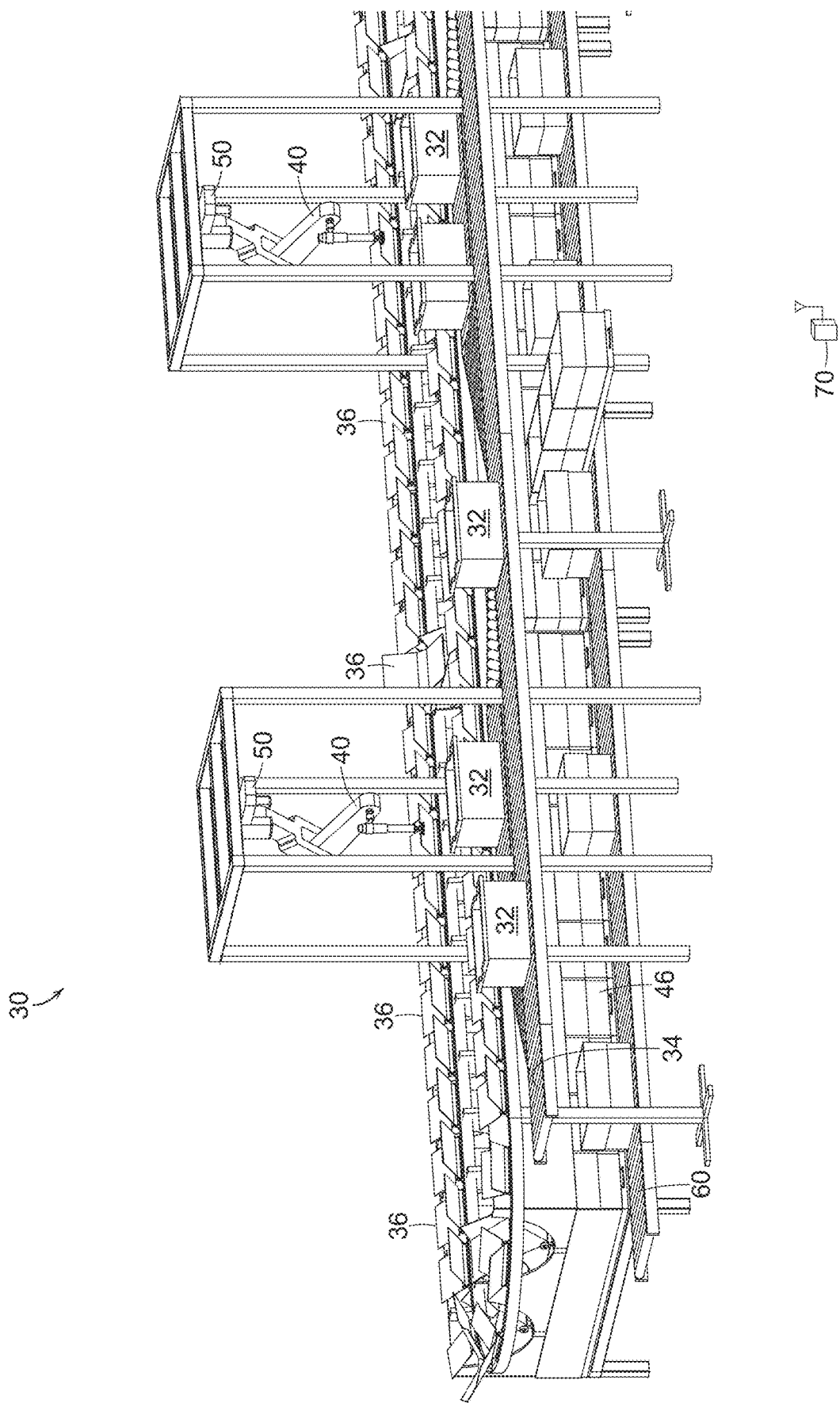
FIG. 2 shows an illustrative diagrammatic view of an object processing system in accordance with an embodiment of the present invention.

FIG. 2, for example, shows a system 30 in accordance with an embodiment of the present invention in which supply bins 32 are provided on a supply conveyor 34. Selected supply bins 32 are routed to an input area 33, and with further reference to FIG. 3, an end effector 41 of a programmable motion device 40, grasps an object form a supply bin, and places the object into an adjacent tilt tray 36. Sensors 35 that are positioned along the supply conveyor 34 detect indicia on the supply bins, and the system 70 thereby knows the position and location of each of the supply bins 32 on the conveyor 34 at all times as the speed of the conveyor is also known and controlled. The tilt trays are provided on a tilt tray track 38 along which the tilt trays 36 are moved. The tilt trays 36 are adapted to dump any contents into a reciprocal carriage, which may provide objects to destination bins 46 as discussed in more detail below.

Figure 3:
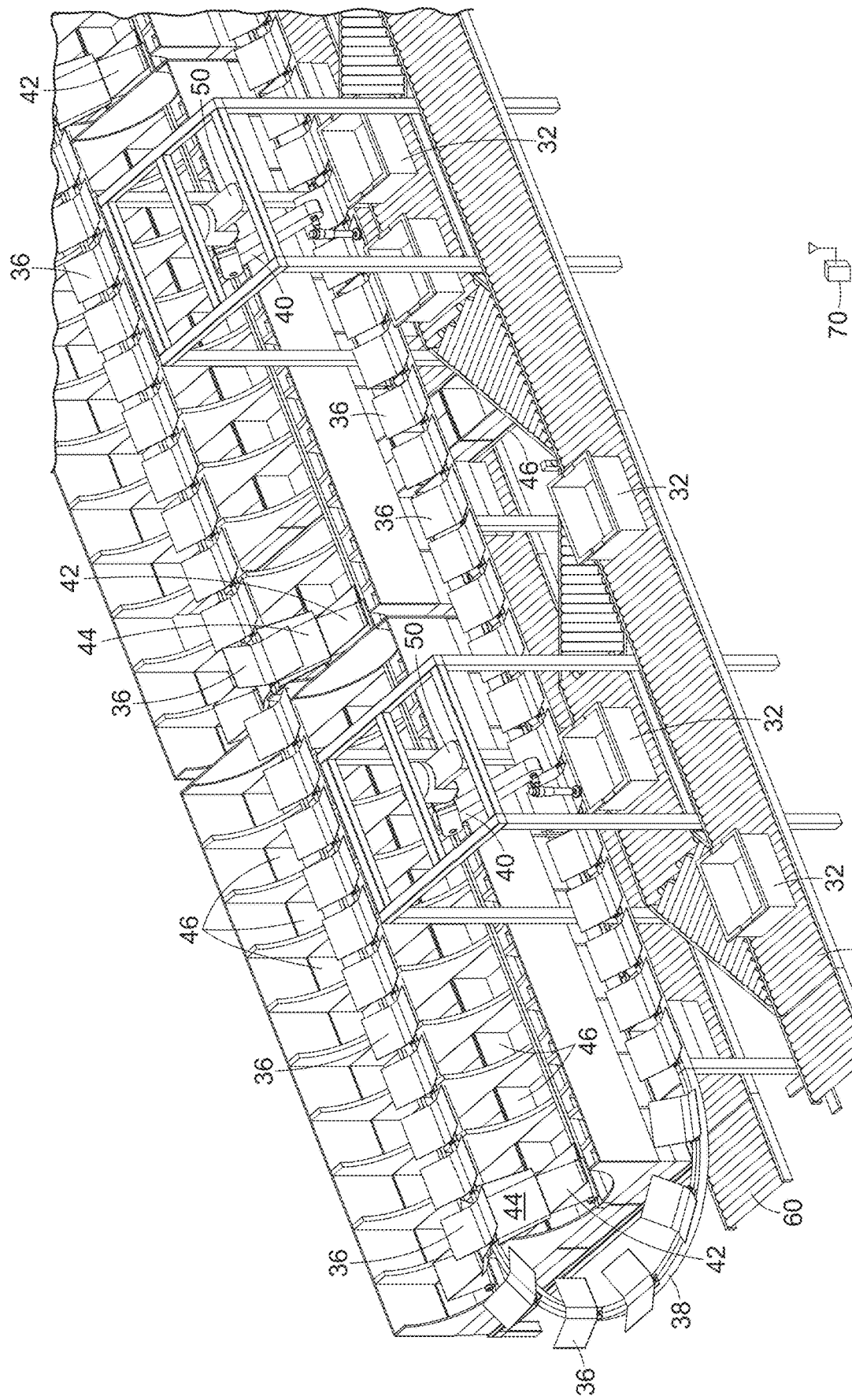
FIG. 3 shows an illustrative diagrammatic alternate view of the object processing system of FIG. 2.

FIG. 3 shows that the tilt trays 36 travel in a circuit, and when a tilt tray 36 is above a designated shuttle carrier 42, the tilt tray 36 dumps its contents into the shuttle carrier 42. Guides 44 may also be provided that facilitate an object landing cleanly in the shuttle carrier 42. As further shown with reference to FIG. 4, each shuttle carrier reciprocally moves along a track 45, and when positioned adjacent a desired destination bin 46, the shuttle carrier 42 may also tilt to drop the object into the desired destination bin 46 as discussed in more detail below. Completed (e.g., either full or otherwise finished) bins may be removed via pull out drawers 48 in accordance with an embodiment. When a drawer is being serviced (has been removed), no objects will be destined to be placed into a destination bin on the drawer 48. Each drawer may carry, for example, two destination bins from either of two sides of each carriage 42 and carriage track 45, again, as discussed in more detail below.

The bins may be provided as boxes or containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

Figure 4:
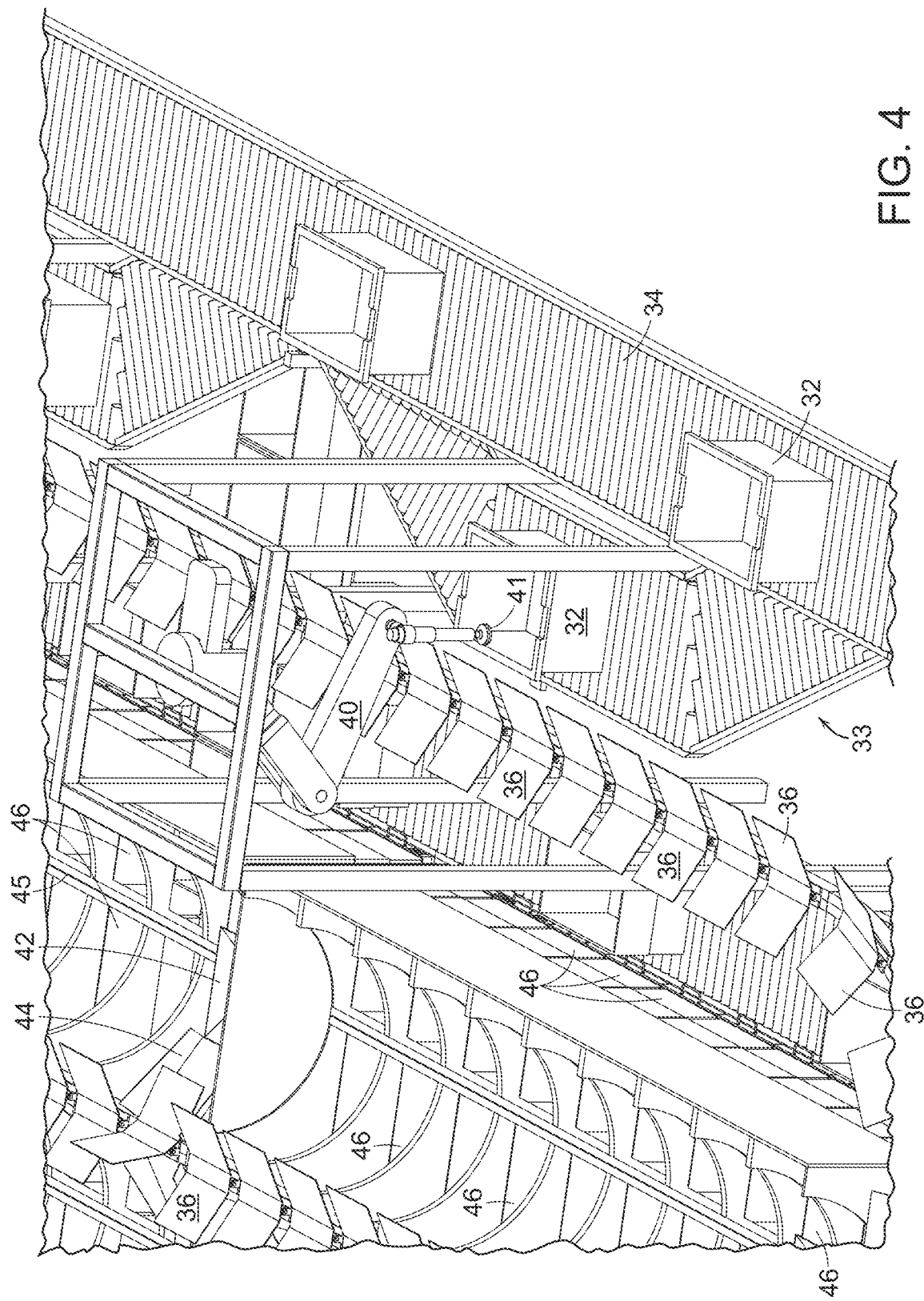
FIG. 4 shows an illustrative diagrammatic view of an object processing station in the object processing system of FIG. 2.

The operations of the system described above are coordinated with a central control system 70 as shown in FIGS. 2-4 that communicates (e.g., wirelessly) with the articulated arm 40, the perception units 35 and 50, as well as in-feed conveyor 34 and the tilt tray track 38 drive as well as the shuttle 42 drive systems. This system determines from symbol strings the UPC associated with a vendor bin, as well as the outbound destination for each object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 5:
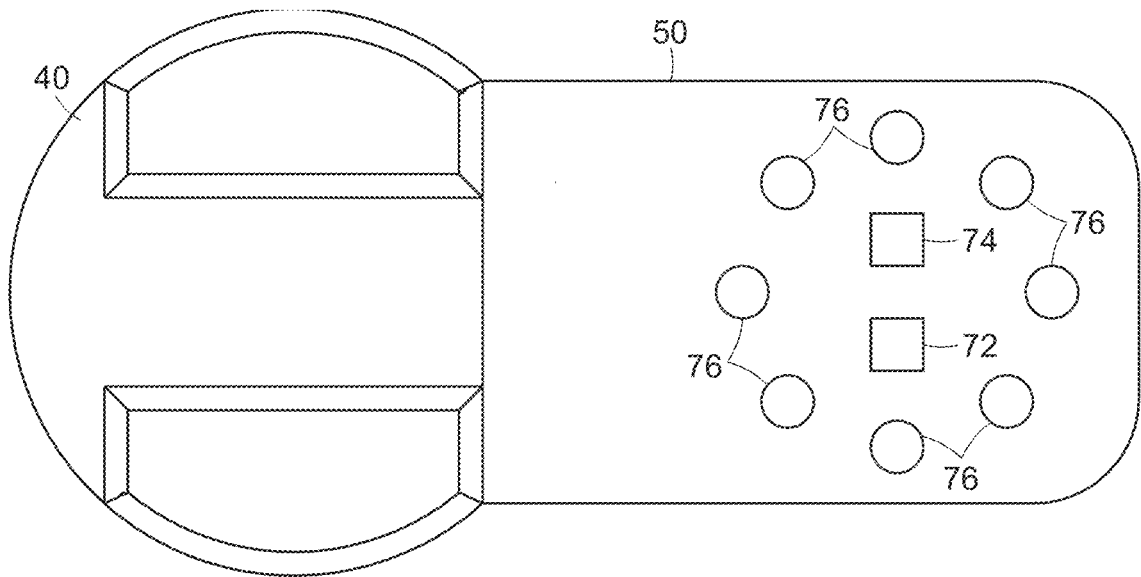
FIG. 5 shows an illustrative diagrammatic view of the perception system of FIGS. 2-4.

As discussed above with reference to FIGS. 2-4, the system of an embodiment includes a perception system (e.g., 50) that is mounted above a bin of objects to be processed next to the base of the articulated arm 40, looking down into a bin 32. The system 50, for example and as shown in FIG. 5, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 6:
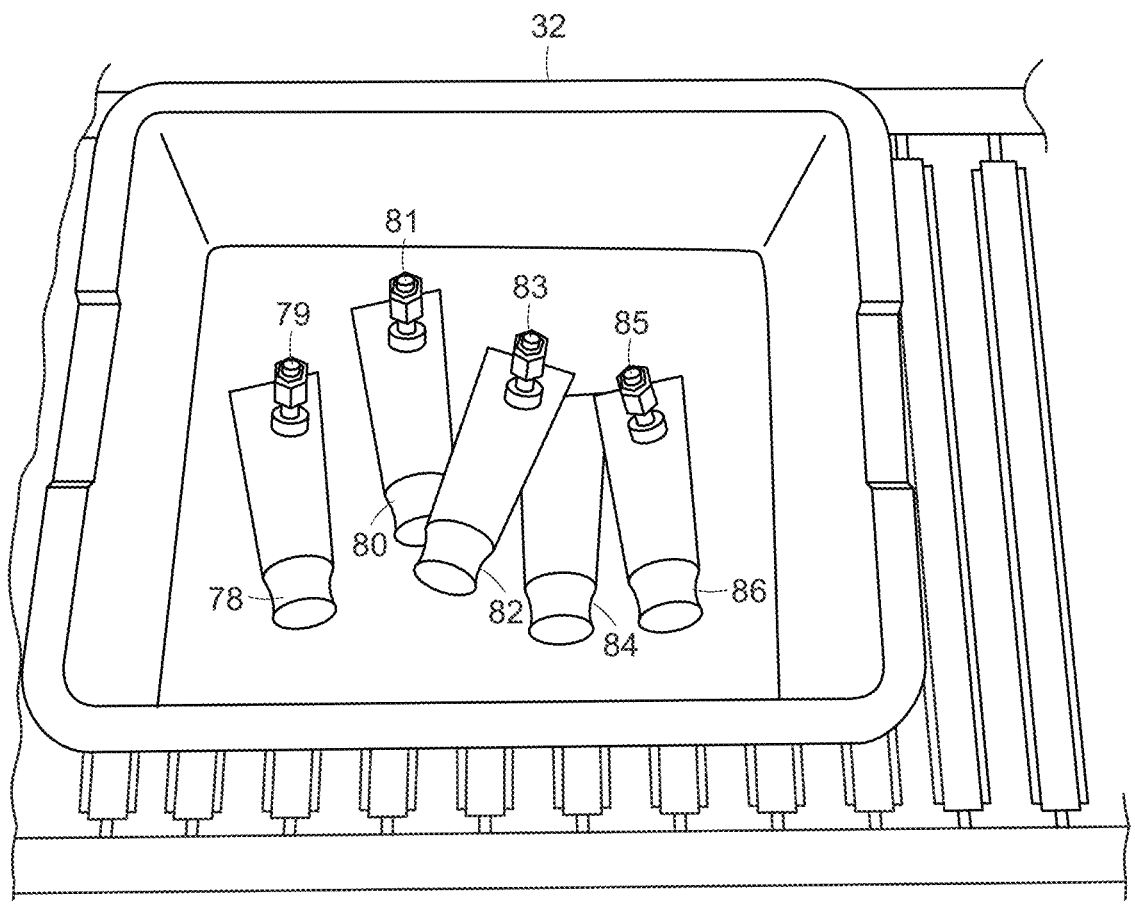
FIG. 6 shows an illustrative diagrammatic view from the perception system of FIGS. 2-4, showing a view of objects within a bin of objects to be processed.
Figure 11:
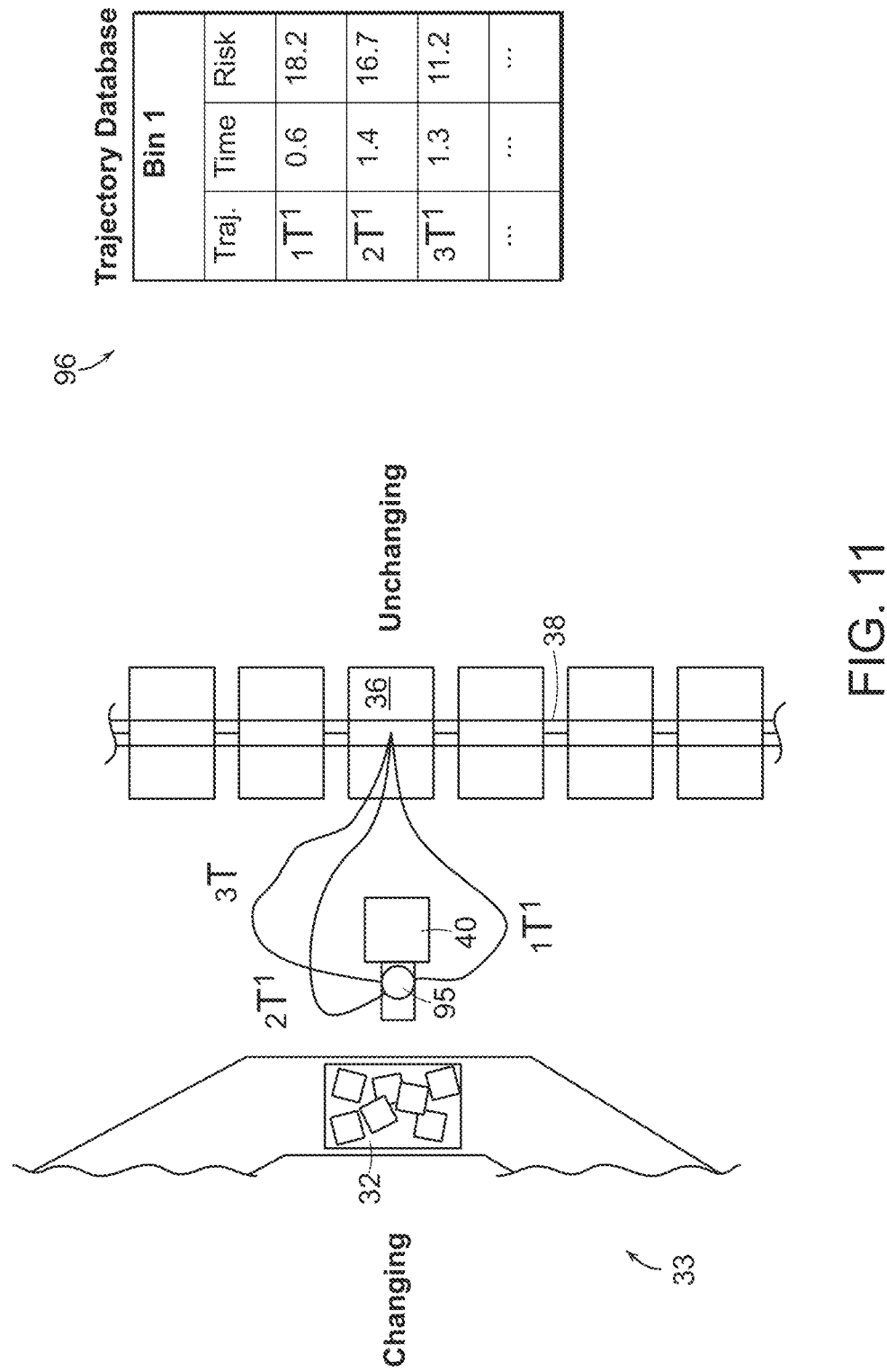
FIG. 11 shows an illustrative diagrammatic top view of the system of FIG. 10, showing multiple possible paths from the programmable motion device to a destination carrier.

FIG. 6 shows an image view from the perception unit 50. The image view shows a bin 32 in an input area (a conveyor), and the bin 32 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 11. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 7A:
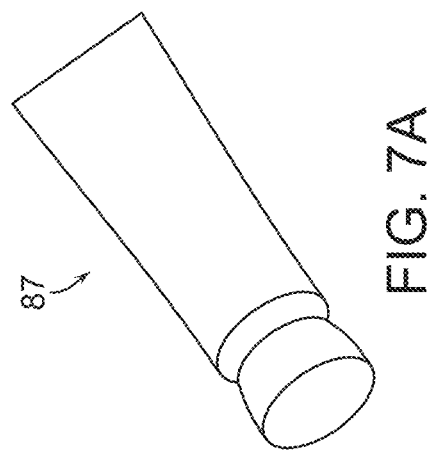
FIGS. 7A and 7B show an illustrative diagrammatic view of a grasp selection process in an object processing system of an embodiment of the present invention.
Figure 7B:
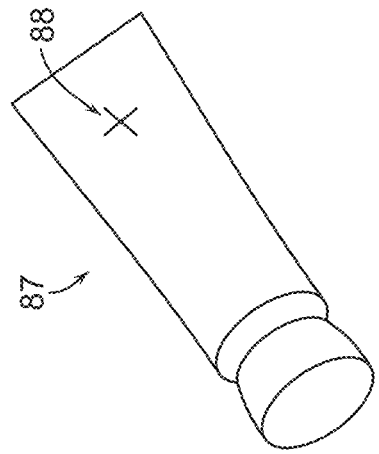

As shown in FIGS. 7A and 7B, the perception system may also identify portions of an object that are the most flat in the generation of good grasp location information. In particular, if an object includes a tubular end and a flat end such as object 87, the system would identify the more flat end as shown at 88 in FIG. 7B. Additionally, the system may select the area of an object where a UPC code appears, as such codes are often printed on a relatively flat portion of the object to facilitate scanning of the barcode.

Figure 9A:
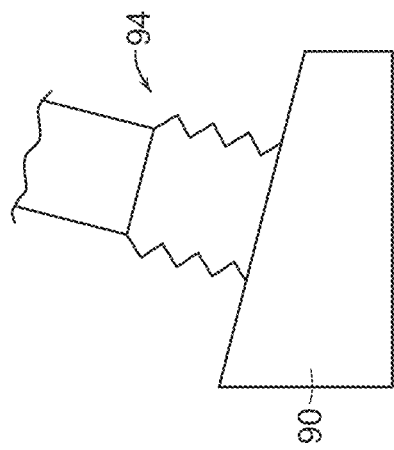
FIGS. 9A and 9B show an illustrative diagrammatic view of a grasp execution process in an object processing system of an embodiment of the present invention.
Figure 9B:
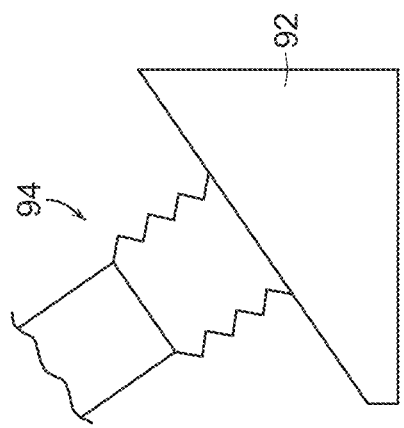
Figure 8A:
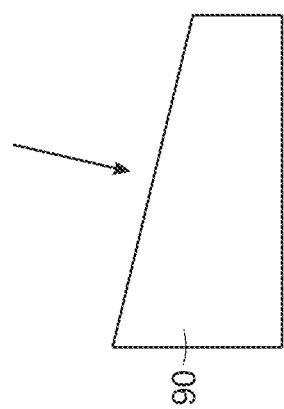
FIGS. 8A and 8B show an illustrative diagrammatic view of a grasp planning process in an object processing system of an embodiment of the present invention.
Figure 8B:
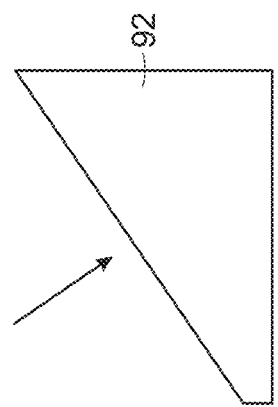

FIGS. 8A and 8B show that for each object 90, 92, the grasp selection system may determine a direction that is normal to the selected flat portion of the object 90, 92. As shown in FIGS. 9A and 9B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

In accordance with various embodiments therefore, the invention further provides a processing system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance based features as depth sensors may not always be accurate enough to provide sufficient information about graspability. For example, the system can learn the location of fiducials such as barcodes on the object, which can be used as indicators for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The system of an embodiment may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

FIG. 10 for example, shows a diagrammatic view of a system in accordance with an embodiment of the invention that includes an input area 33 conveyor that provide input bins 32 to a programmable motion device (as shown diagrammatically at 40), such as an articulated arm, having a base as shown at 59, and an end effector (shown diagrammatically at 94) that is programmed to have a home position (shown at 95), and is programmed for moving objects from an input bin 32 to processing locations, e.g., destination locations at the plurality of destination bins 46. Again, the system may include a defined home or base location 95 to which each object may initially be brought upon acquisition from the bin 32. The tilt trays 36 may provide objects to destination bins 46 as discussed further below.

In certain embodiments, the system may include a plurality of base locations, as well as a plurality of predetermined path portions associated with the plurality of base locations. The trajectories taken by the articulated arm of the robot system from the input bin to the base location are constantly changing based in part, on the location of each object in the input bin, the orientation of the object in the input bin, and the shape, weight and other physical properties of the object to be acquired.

Once the articulated arm has acquired an object and is positioned at the base location, the paths to each of the plurality of destination bins 46 are not changing. In particular, each destination bin is associated with a unique destination bin location, and the trajectories from the base location to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base locations and destination bin locations.

FIG. 11 for example, shows three such trajectories ($_1T^1$, $_2T^1$ and $_3T^1$) between base location 95 and a tilt tray location 36. The elements of FIG. 11 are the same as those of FIG. 10. Each trajectory will have an associated time as well as an associated risk factor. The time is the time it takes for the articulated arm of the robotic system to accelerate from the base location 95 move toward the tilt tray 36, and decelerate to the tilt tray location 36 in order to place the object in the tilt tray 36.

The risk factor may be determined in a number of ways including whether the trajectory includes a high (as pre-defined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 96 in FIG. 11, the trajectory $_1T^1$ from the base location 95 to the destination location at tilt tray 36 may have a fast time (0.6 s) but a high risk factor. The trajectory $_2T^1$ from the base location 95 to the destination location at tilt tray 36 may have a much slower time (1.4 s) but still a fairly high risk factor (16.7). The trajectory $_3T^1$ from the base location 95 to the destination location at tilt tray 36 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object. Different trajectories therefore, may have different times and risk factors, and this data may be used by the system in motion planning.

Figure 12:
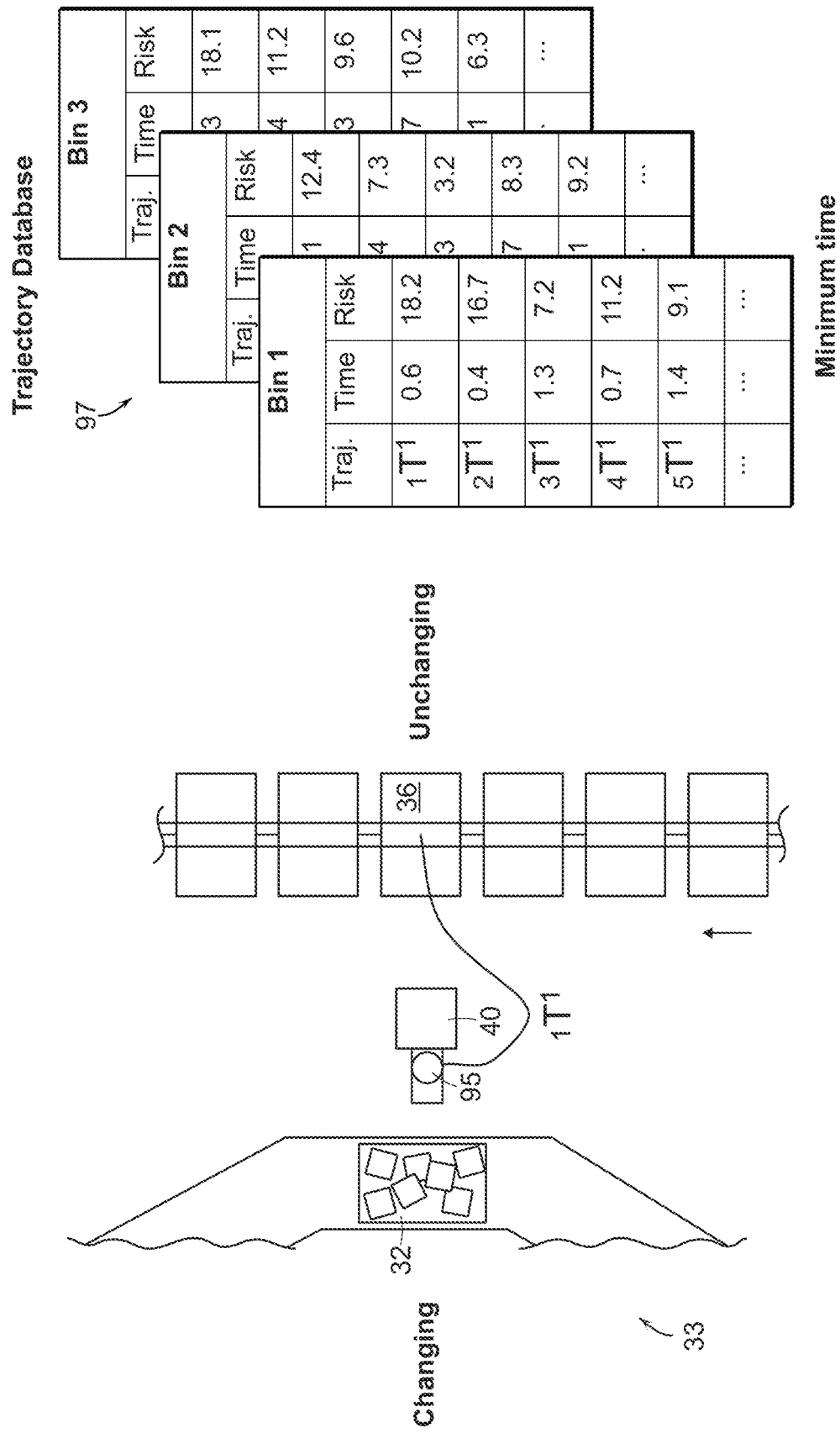
FIG. 12 shows an illustrative diagrammatic top view of the system of FIG. 10, showing a path from the programmable motion device to a destination carrier with an emphasis on minimum time.

FIG. 12, for example, shows minimum time-selected trajectories from the base location 95 to tilt tray 36. In particular, the tables shown at 97 that the time and risk factors for a plurality of the destination bins, and the trajectories from the base location 95 to the destination bin location is chosen to provide the minimum time for motion planning for motion planning under a risk factor of 14.0.

Figure 13:
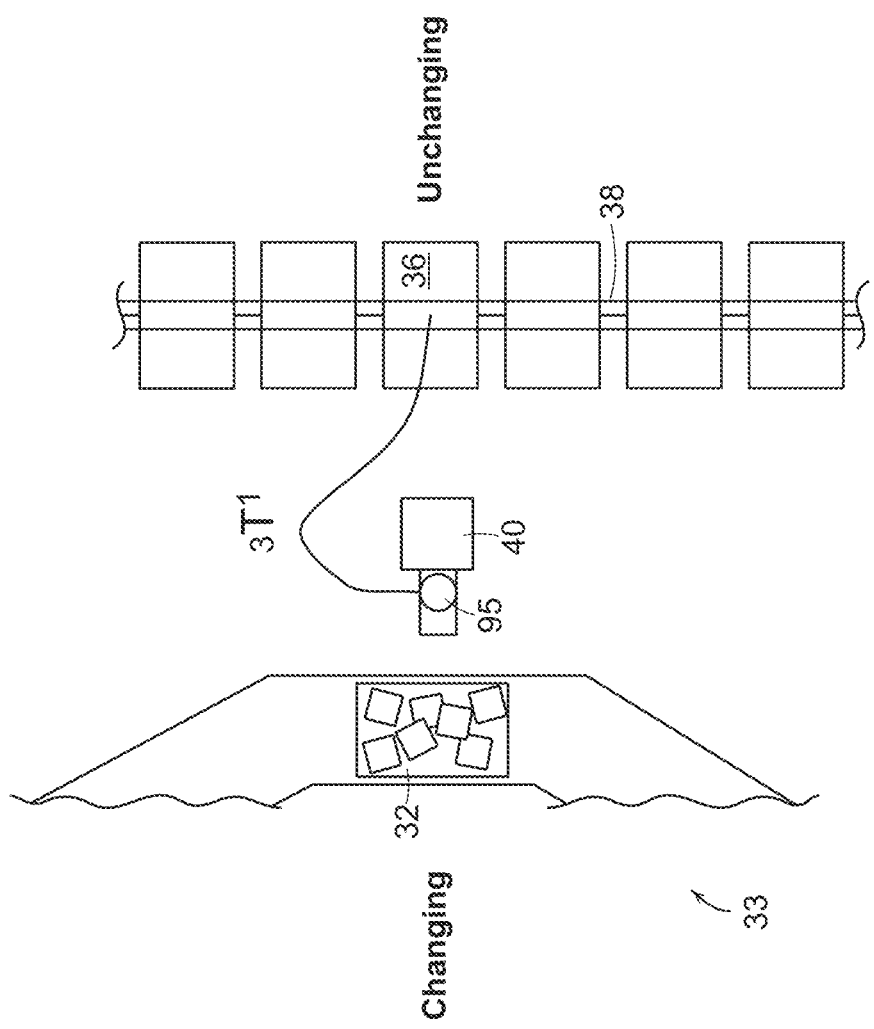
FIG. 13 shows an illustrative diagrammatic top view of the system of FIG. 10, showing a path from the programmable motion device to a destination carrier with an emphasis on minimum risk.

FIG. 13 shows minimum risk-factor-selected set of trajectories from the base location 95 to the destination locations at tilt tray 36. Again, the tables shown at 97 show the time and risk factors for the tilt tray 36. The trajectories from the base location 95 to the destination bin locations at tilt tray 36 is chosen to provide the minimum risk factor for motion planning for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Overall trajectories therefore, may include any number of changing and unchanging sections. For example. networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products. The system, therefore, provides means that interface with the customer's outgoing object conveyance systems. When a bin (or package) is full as determined by the system (in monitoring system operation), a human operator may pull the bin from the processing area, and place the bin in an appropriate conveyor. When a bin is full it gets removed to the closed/labelled, another empty bin is immediately placed in the location freed up by the removed full bin, and the system continues processing as discussed above.

Figure 14:
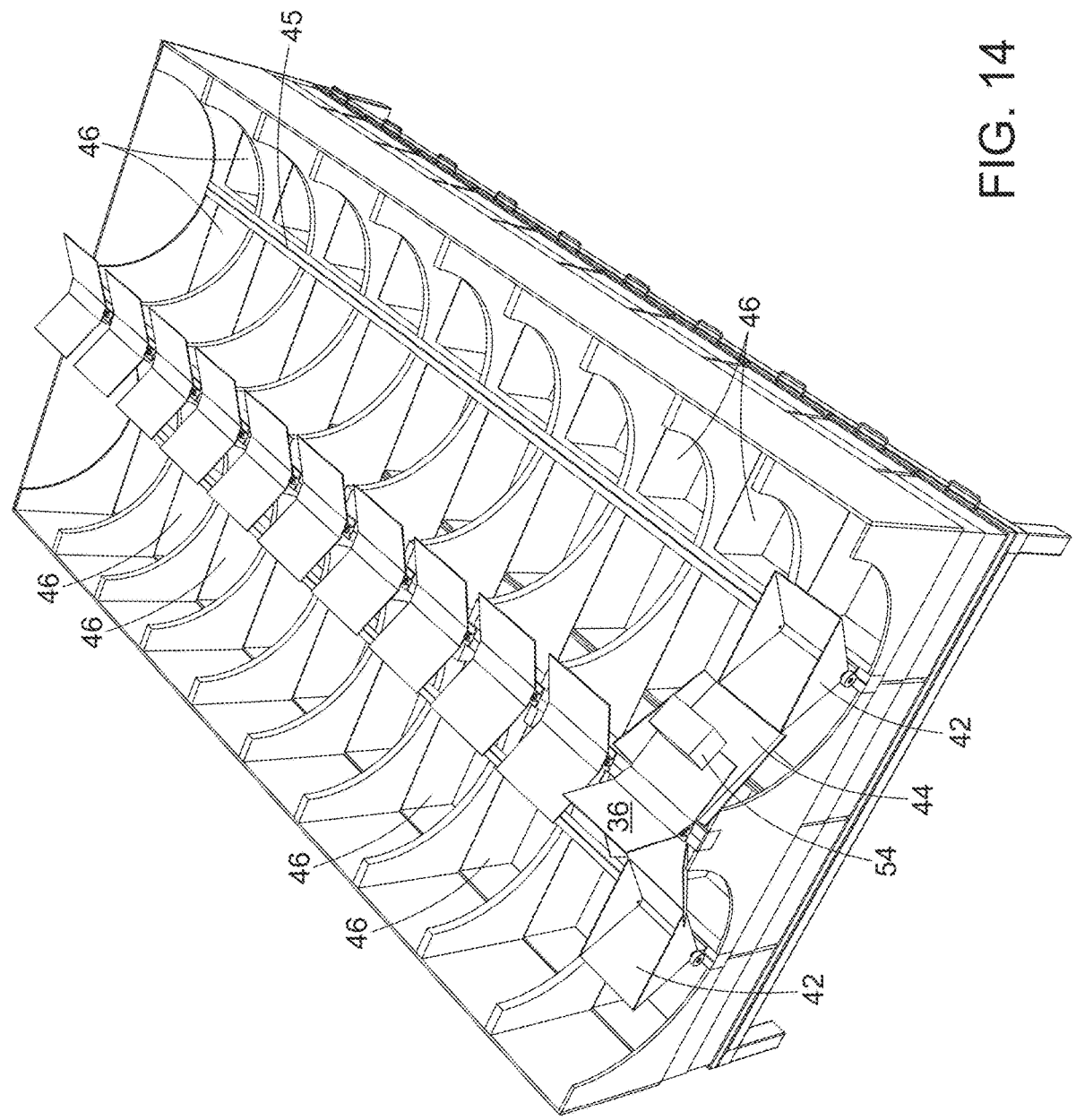
FIG. 14 shows an illustrative diagrammatic view of a tilt tray processing section in an object processing system in accordance with an embodiment of the invention wherein an object is placed in a carriage.
Figure 15:
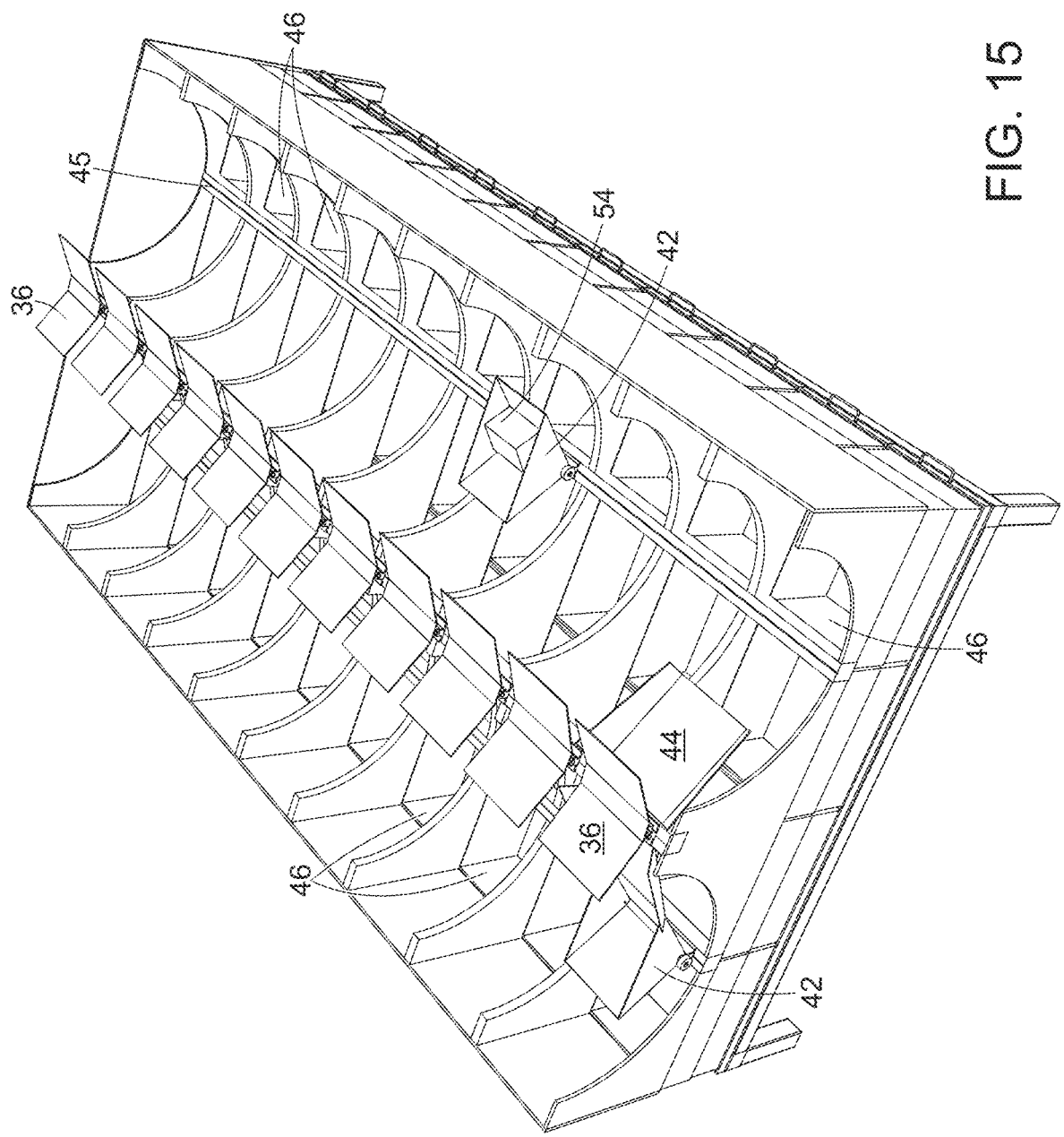
FIG. 15 shows an illustrative diagrammatic view of the processing section of FIG. 14 with the carriage having been moved along its track.
Figure 16:
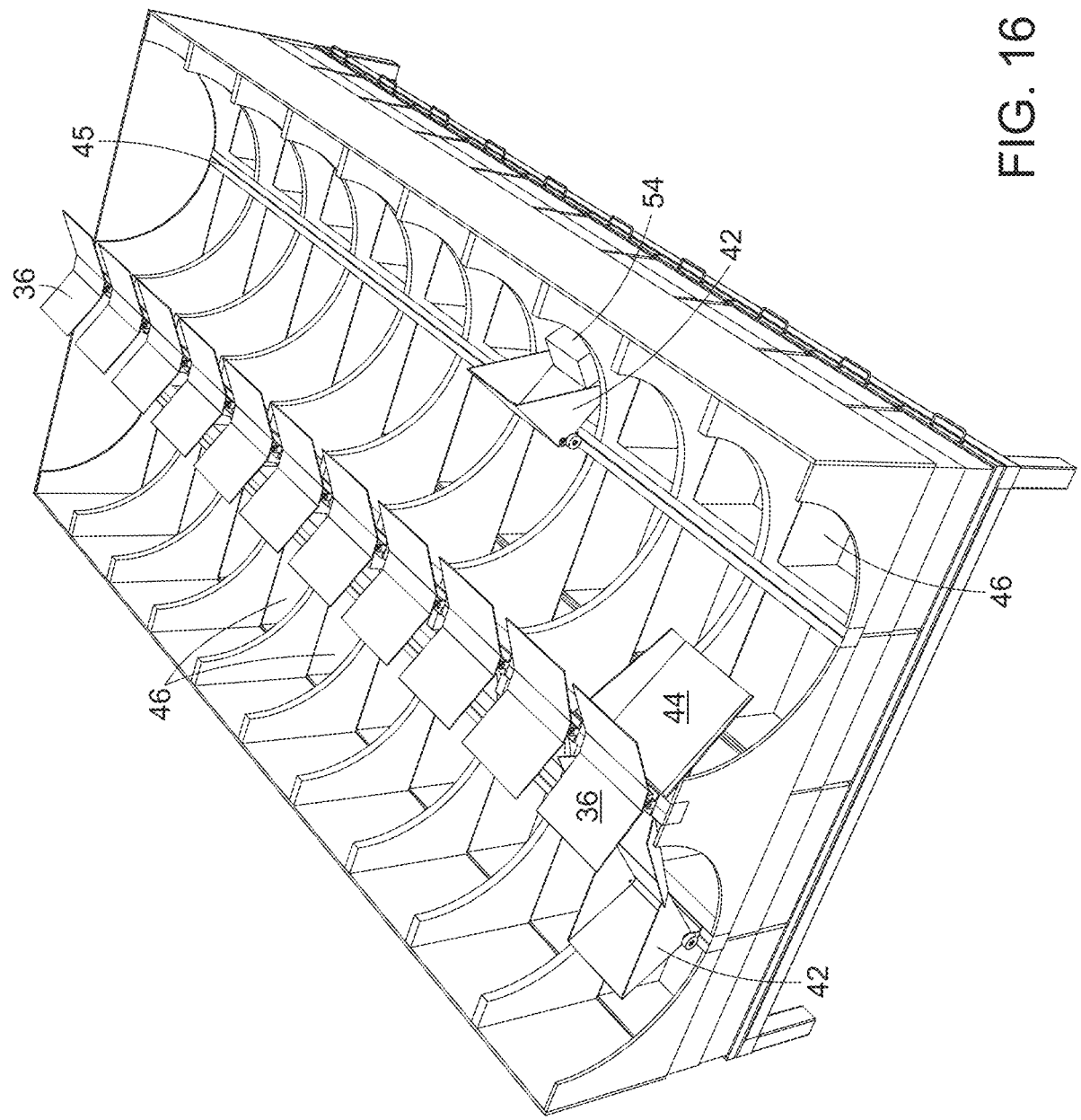
FIG. 16 shows an illustrative diagrammatic view of the processing section of FIG. 14 with the carriage having transferred its load to a destination bin.
Figure 17:
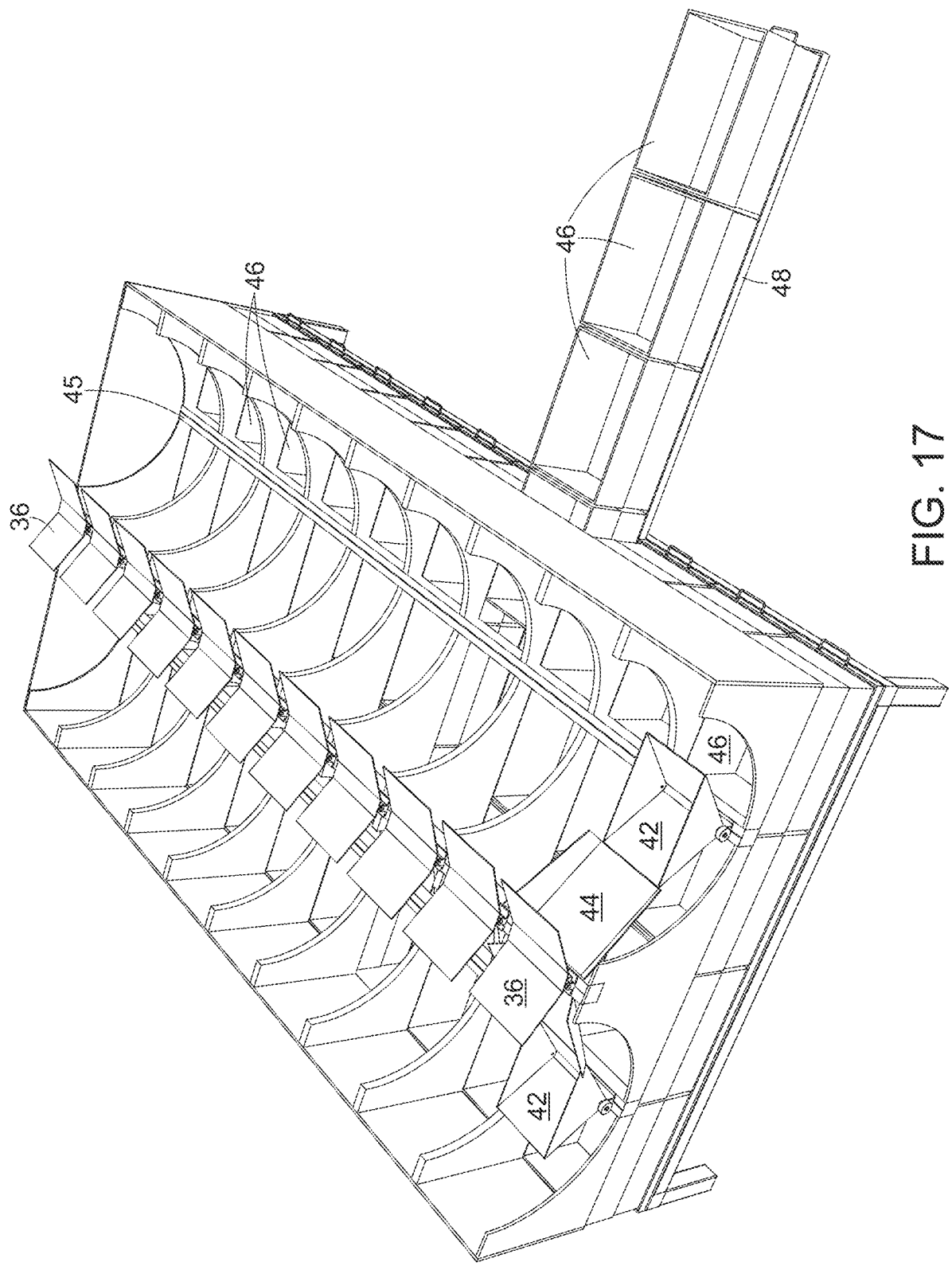
FIG. 17 shows illustrative diagrammatic views of a bin removal mechanism for use in an object processing system in accordance with an embodiment of the invention.
Figure 18:
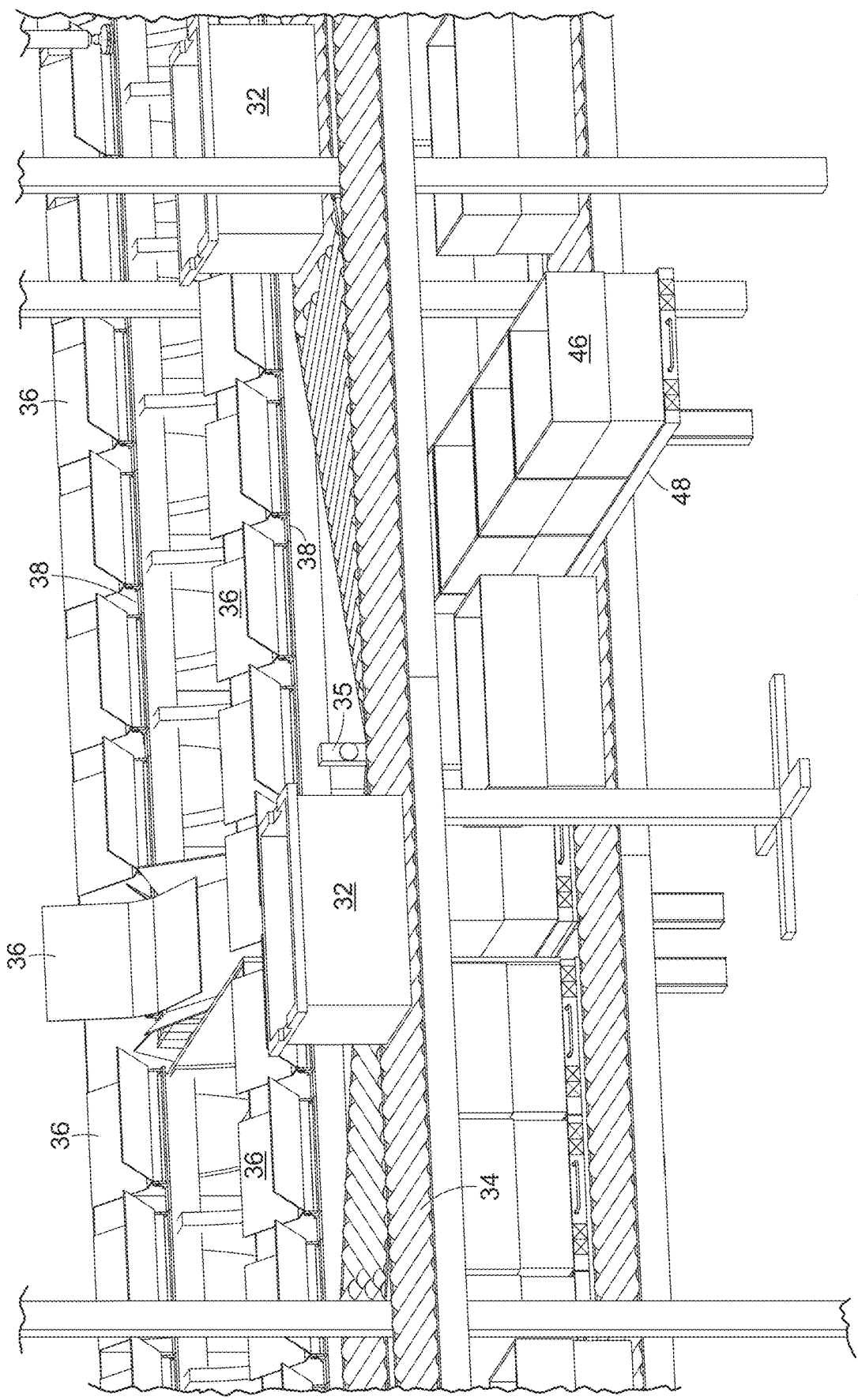
FIG. 18 shows an illustrative diagrammatic alternate view of the bin removal mechanism of FIG. 17.

With reference to FIG. 14, when a tilt tray 36 (carrying an object 54) is above a shuttle wing carriage 42, the tilt tray may tilt to drop the object 54 into the carriage 42. The tilt tray 36 may tip in either of two directions that are generally orthogonal to the direction of movement of the tilt tray 36 along its track 38 (shown in FIG. 3). Once tipped, the tilt tray 36 drops its object 54 into a carriage 42 that is adapted to reciprocate along a carriage track 45 between two rows of destination bins 46. With reference to FIG. 15, the carriage may move to a desired destination bin 46, and may itself tip to drop its contents (the object 54) into a desired destination bin 46 as shown in FIG. 16. When a destination bin 46 is full or is otherwise complete (e.g., the system does not expect any more objects to be routed to the bin within a set period of time), the system may then designate the bin as finished, and light indicators 57 on the respective drawer will illuminate, indicating which of the bins in the drawer is full. The full bin is then removed from the drawer 48, and the full bin 51 is placed on an output conveyor 60 (as shown in FIG. 18) by a human operator.

The assignment of carriers may also be dynamic since any carrier may dynamically be assigned to service any package below the track. For example, systems in accordance with further embodiments, provide improved transport and conveyor systems, and provide programmable diverters, in particular, that allow dynamically changing patterns of object handling, with resulting efficiencies in the sortation or processing of objects, and lower space requirements, lower demand for manual operations, and as a consequence, lower capital and operating costs for the entire system.

During use, for example and in accordance with certain embodiments, the system may identify an object by the perception system, and then dynamically assign a destination location (carrier 46) to the object. The process is still governed by the overall manifest, but the assignment of destination bins may be dynamic, based on a variety of heuristic, such as the likelihood of receiving objects for the same designation (e.g., if the likelihood is high, the destination location may be assigned to be close to the home position of the carriage in order to save time), as well as whether to assign a second destination bin to an object (e.g., if the likelihood of receiving objects for the same destination is very high).

The system therefore assigns a bin to an object if a new bin is available, and the object is not yet assigned a bin at the sorting station. What is significant, is that the sorting station is not pre-assigned a large set of collection bins assigned to all possible objects that may appear in the input path. If a bin is not assigned to an object, yet no new bin is available for a new assignment, the object may be returned to the input hopper until it is processed at a time that a new bin becomes available. Further, the central controller may employ wide variety of heuristics that may further shape the process of dynamically assigning objects to collection bins as discussed in yet further detail below. Once bins are either filled or otherwise completed, the completed bins are signaled as being done and ready for further processing.

Figure 19:
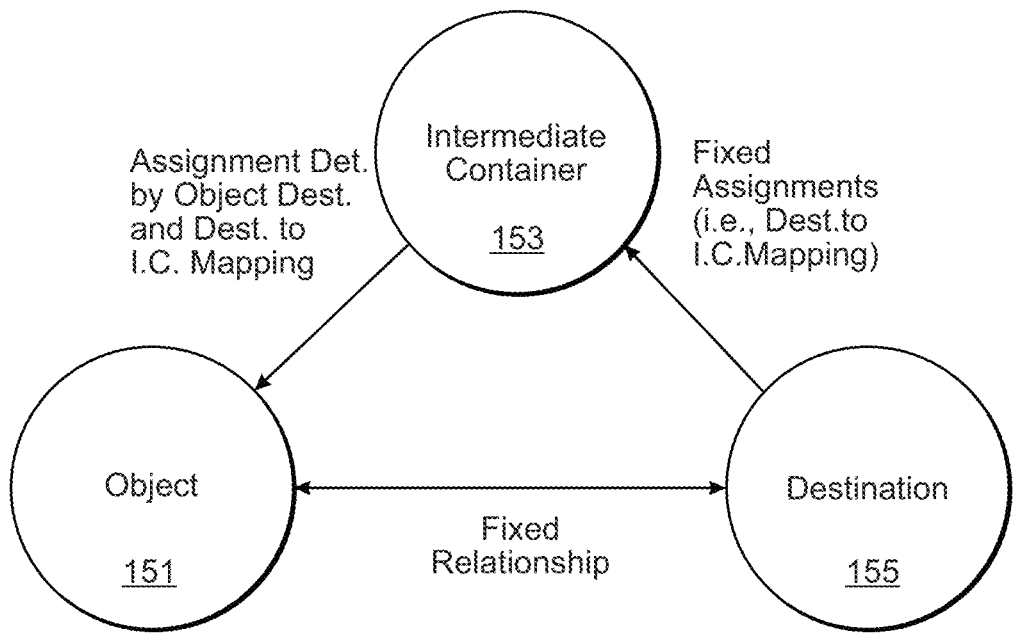
FIG. 19 shows an illustrative diagrammatic view of an object assignment relationship in a conventional sortation system.
Figure 21:
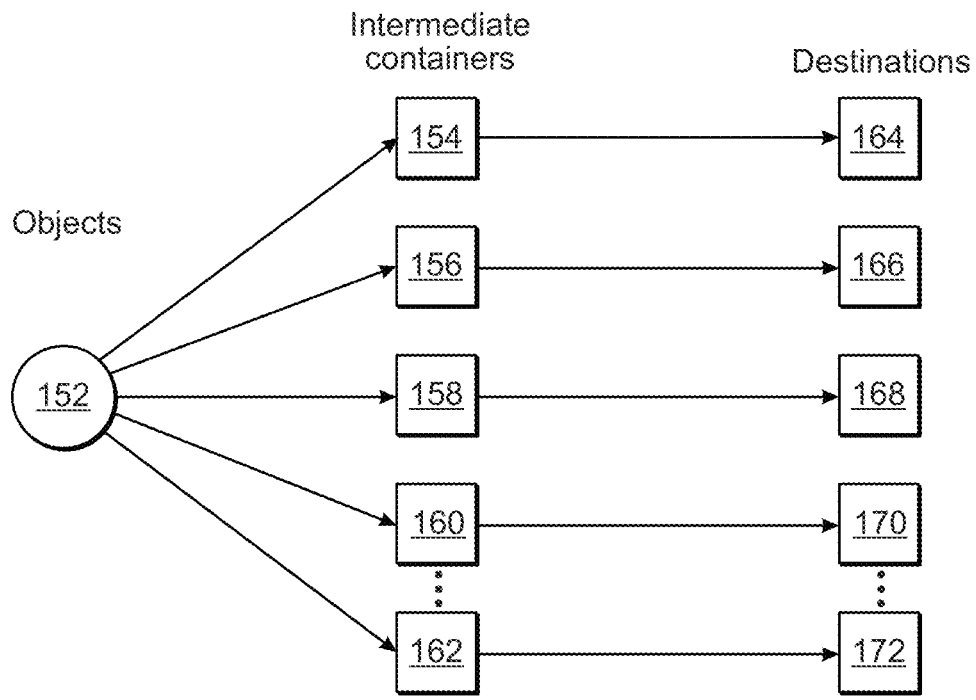
FIG. 21 shows an illustrative diagrammatic view of an object assignment system of FIG. 20.

With reference to FIG. 19, in many processing systems, a fixed relationship may exist between an object 151 and a destination 155 is a fixed relationship. In conventional sortation systems, an intermediate container 153 is assigned a fixed relationship with the destination, and this relationship dictates the assignment of the object 151 to the intermediate container 153. This is shown in FIG. 21, where each destination 164, 166, 168, 170, 172 is associated with an intermediate container 154, 156, 158, 160, 162. As objects 152 are processed, they are simply routed to the appropriate intermediate containers as directed by the fixed relationship.

Figure 20:
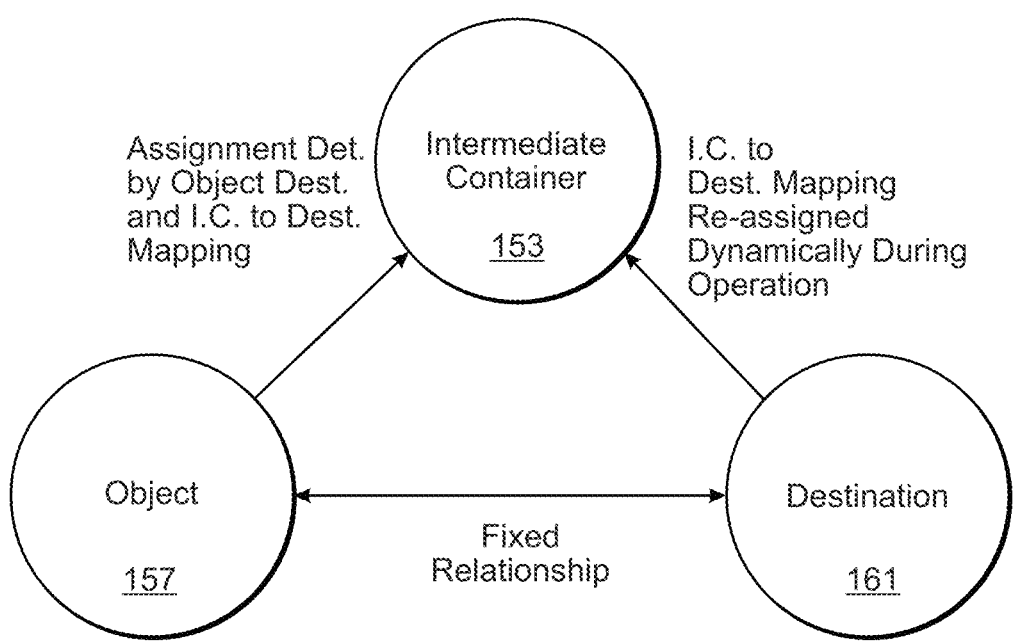
FIG. 20 shows an illustrative diagrammatic view of an object assignment relationship in accordance with certain embodiments of the present invention.

In accordance with embodiments of the present invention on the other hand, the relationships between intermediate containers and destinations is not fixed, and changes dynamically during sortation. FIG. 20, for example, shows that while the relationship between an object 157 and its destination 161 is fixed, the assignment of an intermediate container 153 (e.g., a collection bin), is dynamically chosen based on a variety of heuristics. Once assigned, it remains in place until the collection bin is emptied. As shown in FIG. 20, the assignment of a collection bin (intermediate container 153) for an object 157 is determined by the object destination and the intermediate container to destination mapping, and the destination mapping (between the intermediate container 153 and the destination 161) is re-assigned dynamically during operation.

Figure 22A:
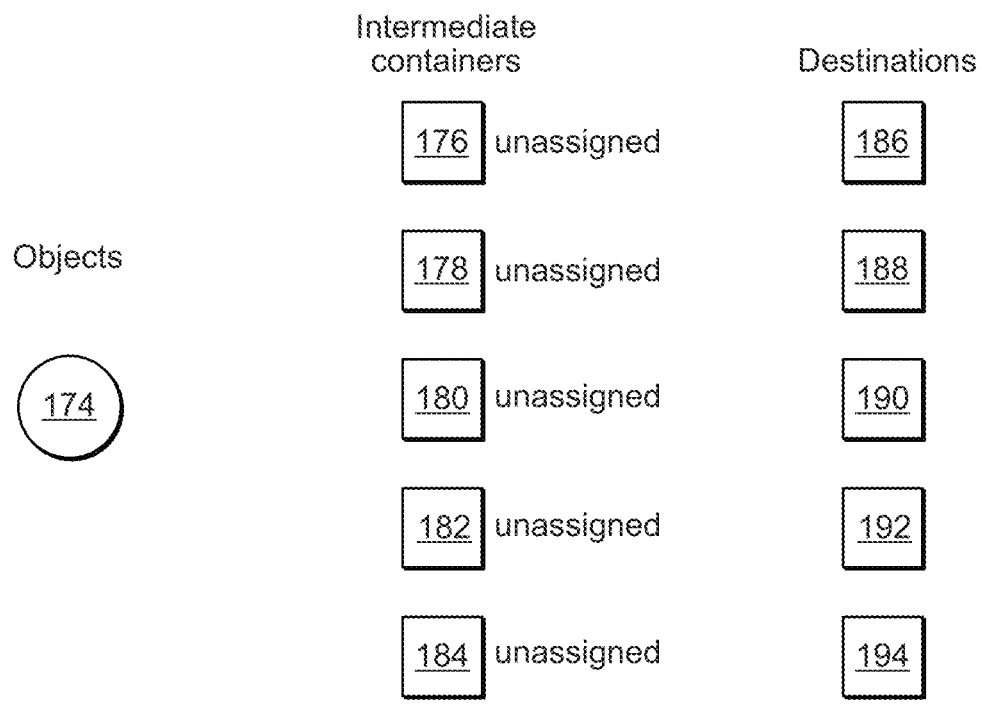
FIGS. 22A-22I show illustrative diagrammatic views of object assignment steps in system in accordance with certain embodiments of the present invention.
Figure 22B:
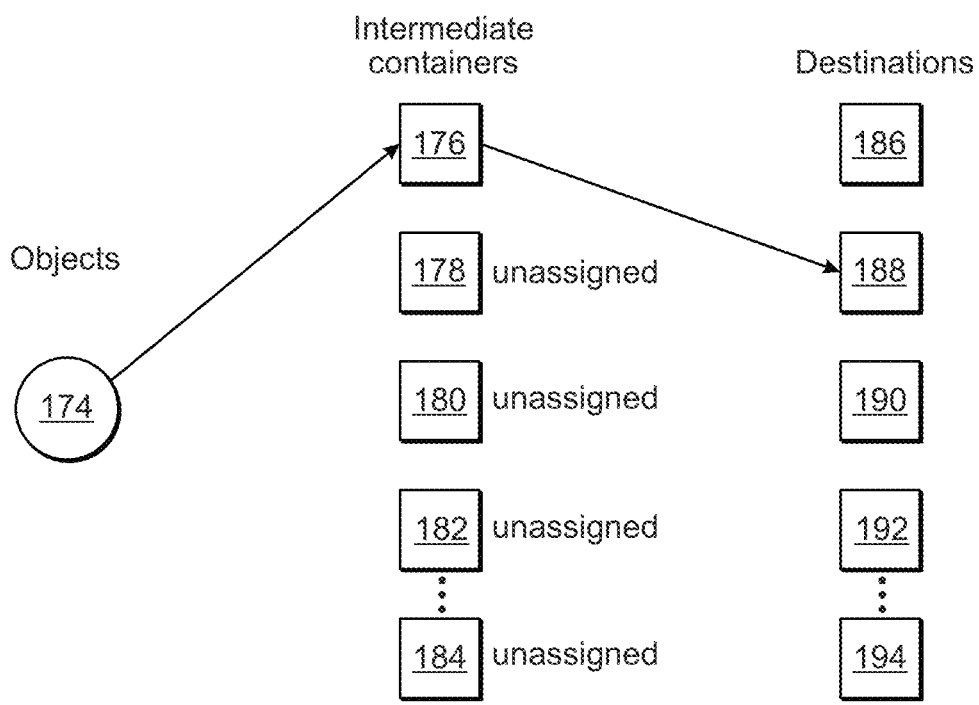
Figure 22C:
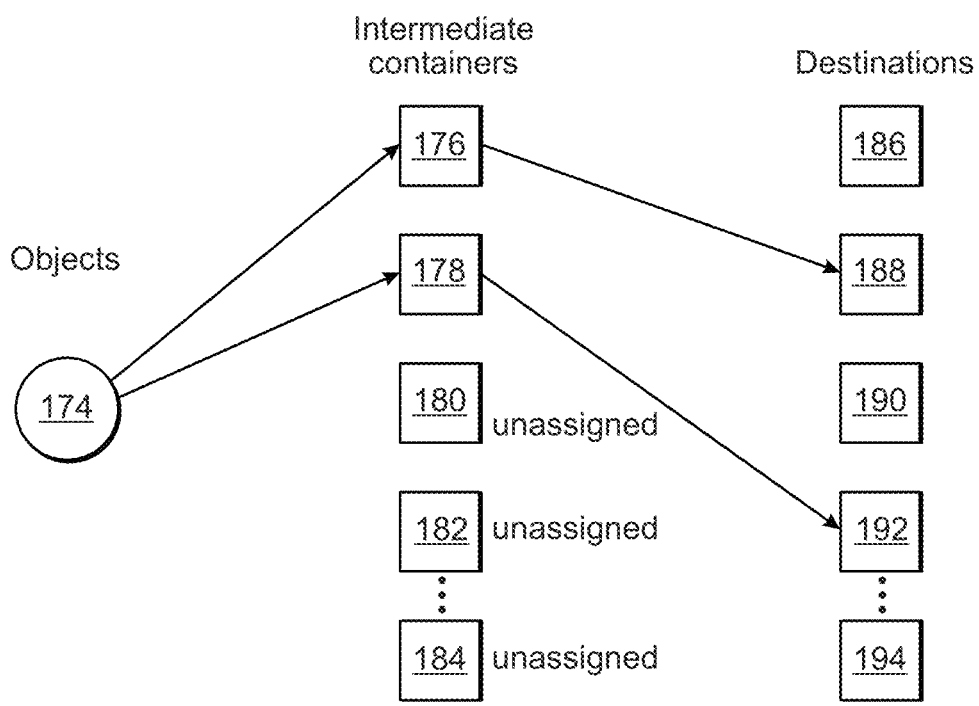
Figure 22D:
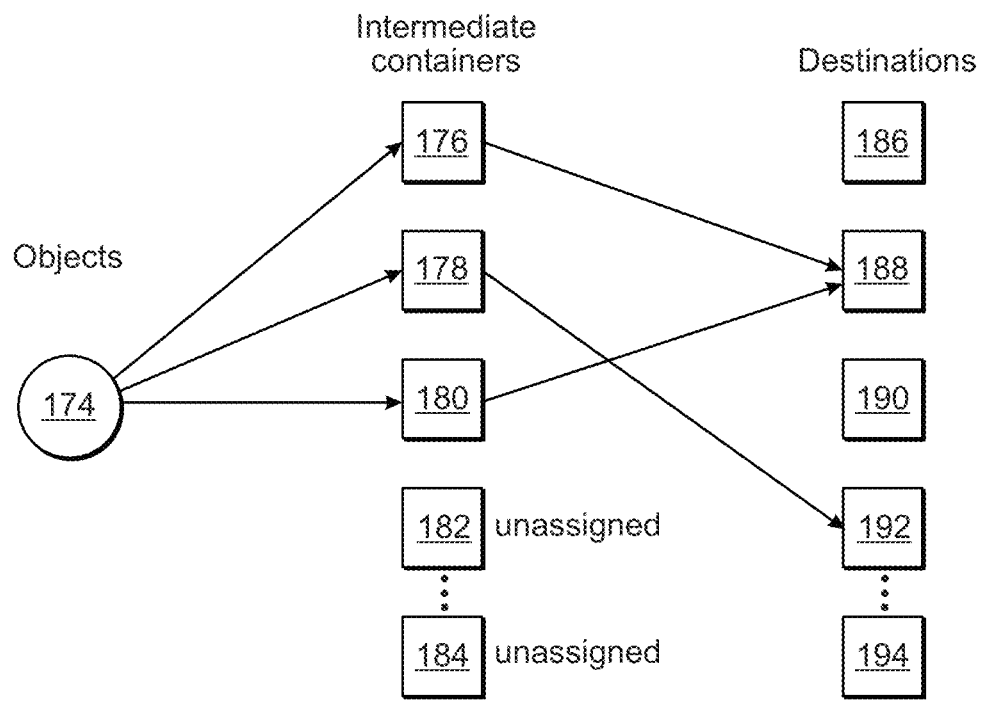
Figure 22E:
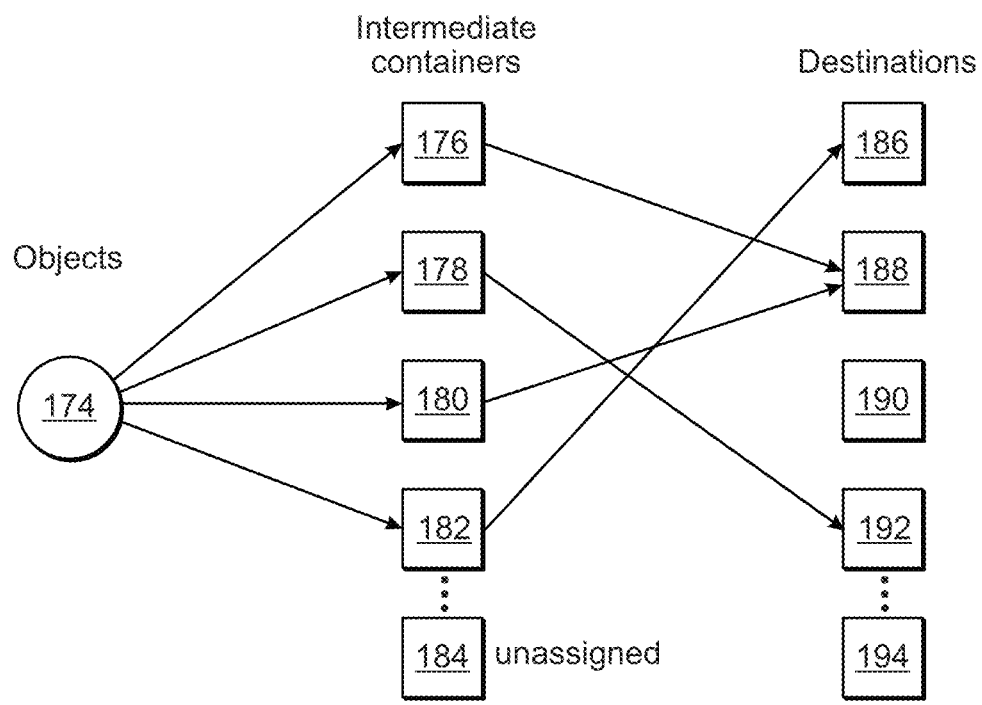
Figure 22F:
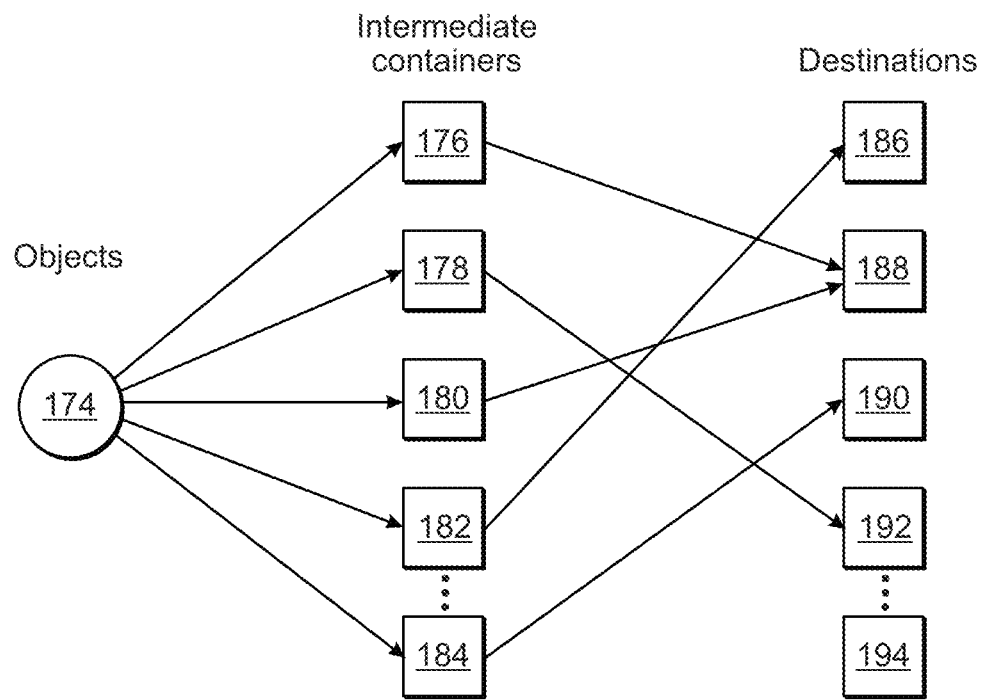

With reference to FIG. 22A, at the beginning of a sortation process, there may be no assigned relationships between intermediate containers 176, 178, 180, 182, 184 and objects 174, or between intermediate containers 176, 178, 180, 182, 184 and destinations 186, 188, 190, 192, 194. As shown in FIG. 22B, when an object's indicia is detected, an intermediate container 176 is assigned to the object, and the object's destination 188 is assigned to the intermediate container as well. Additional objects that are processed and are also associated with the destination 188 are also provided in intermediate container 176. With reference to FIG. 22C, when a different object's indicia is detected that is associated with a different destination 192, a new intermediate container 178 is assigned to the object, and the object's destination 192 is assigned to the intermediate container as well. As noted above, when an object is selected that is associated with a destination, e.g., 188, that already has an intermediate container 176 associated with it, the object may be placed in the same intermediate container 176 (see FIG. 22D). In accordance with certain embodiments of the invention however, and with reference to FIG. 22E, the system may elect to assign a new intermediate container 180 to the destination 188, for example, if it is known that many of the objects are likely to be associated with the destination 188. With reference to FIG. 22F, when another object's indicia is detected that is associated with another destination 186, an new intermediate container 184 is assigned to the object, and the object's destination 186 is assigned to the intermediate container 184.

Figure 22G:
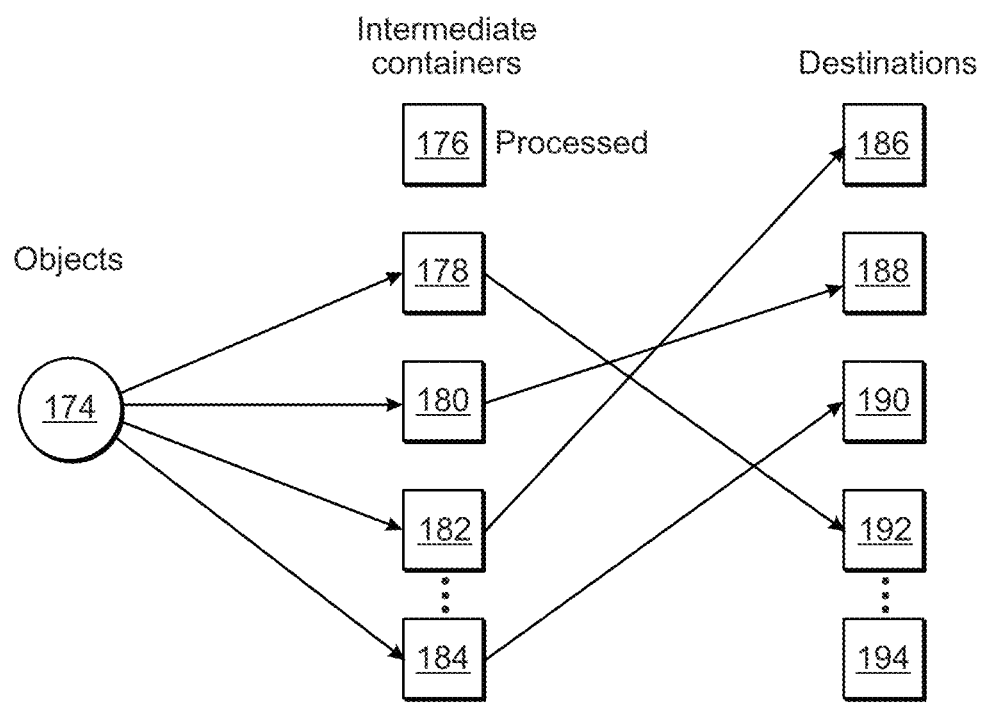
Figure 22H:
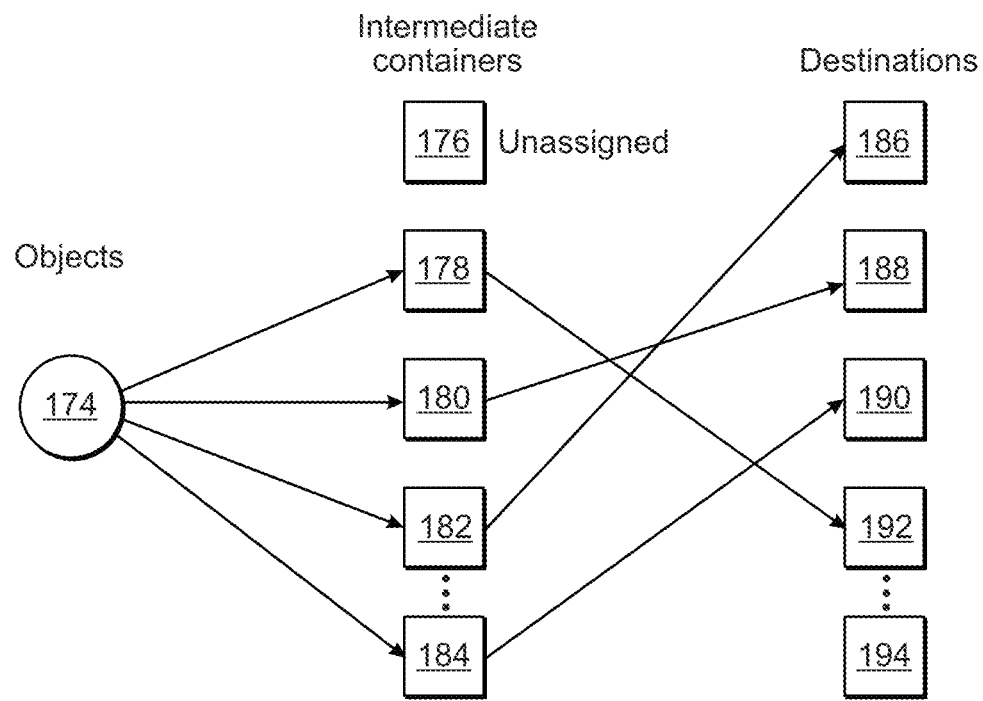
Figure 22I:
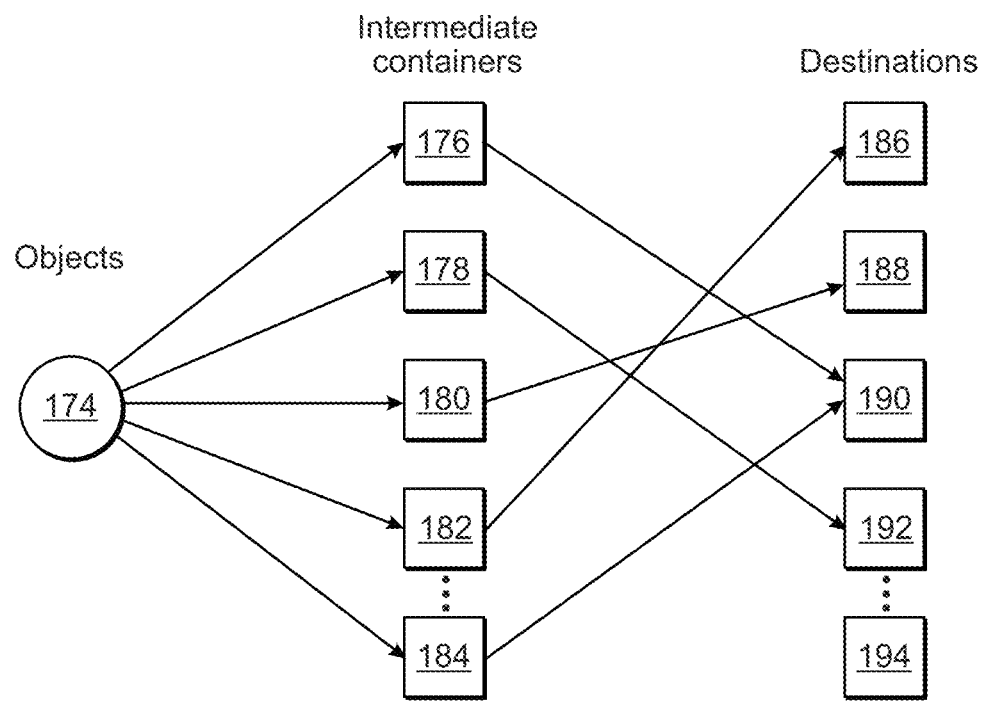

When an intermediate container becomes full or is determined to be otherwise ready for further processing (e.g., if the system determines that it is unlikely to see another object associated with the destination), the intermediate container is emptied and the contents are forward for further processing. For example, and with reference to FIG. 22G, when the system determines that intermediate container 176 is full, the contents are emptied, and the intermediate container 176 is then again unassigned to a destination as shown in FIG. 22H. The intermediate container 176 may then later be reused and associated with a new destination 190 as shown in FIG. 22I.

Figure 23:
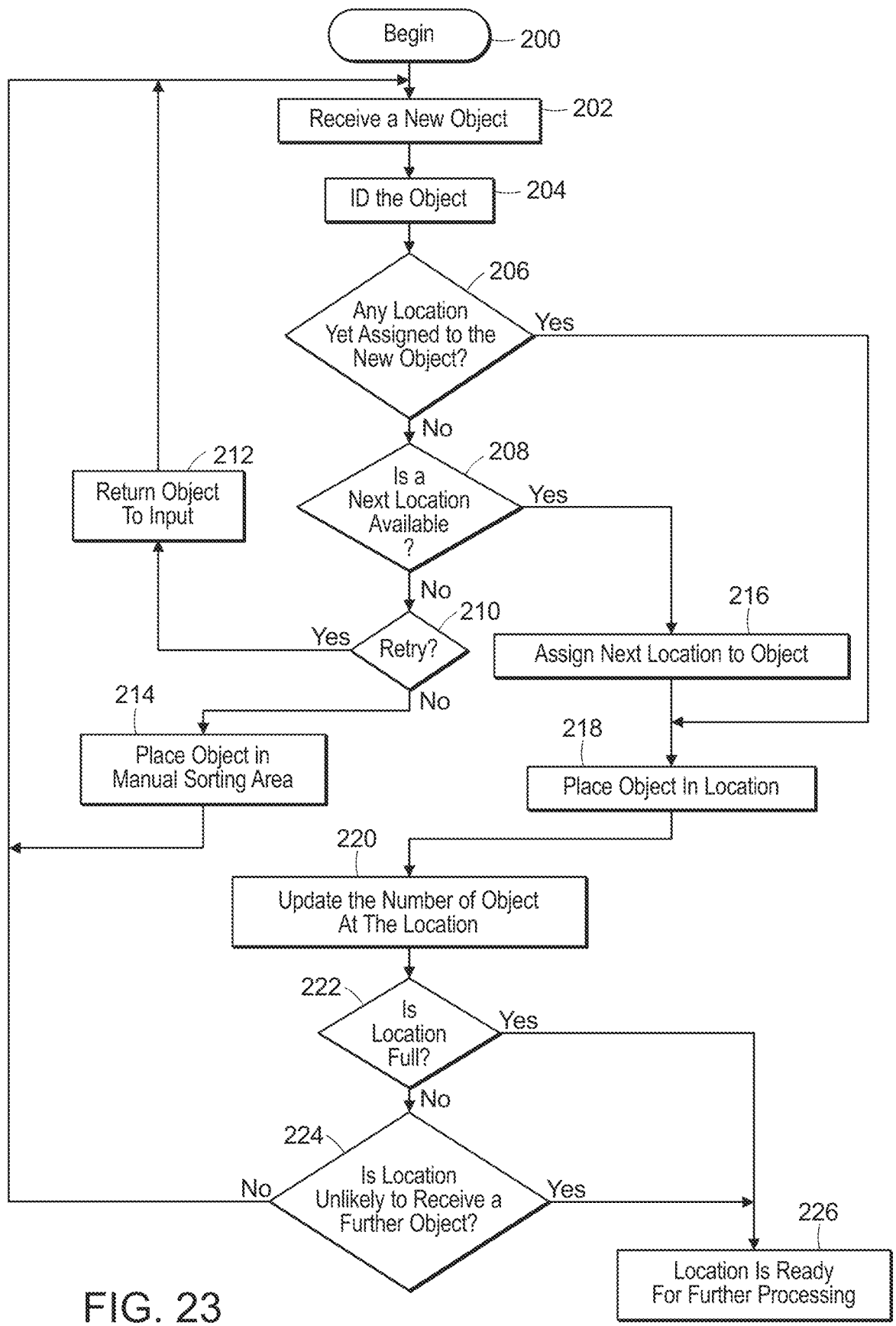
FIG. 23 shows an illustrative flowchart of a process in accordance with an embodiment of the present invention.

As shown in FIG. 23, a sortation process of the invention at a sorting station may begin (step 200) and the articulated arm, or another programmable motion device, receives a new object (step 202). The system identifies the new object (step 204) by an overhead scanner or other scanner system. The system then determines whether any location at the station has yet been assigned to the new object (step 206). If so, the system the places the object at that location (step 218). If not, the system then determines whether a next location is available (Step 208). If not, the system may (either with or without input from a human) determine whether to retry identifying the object (step 210). If so, then the system would return the object to the input stream (step 212) to be again received at a later time (step 202). If not, the system would place the object in a manual sorting area for sortation by a human (step 214). If a next location is available (step 208), the system then assigns a next location to the object (step 216), and the object is then placed in that location (step 218). If a location had already been assigned to the object (step 206), the system provides that the object is placed in that location (step 218). The number of objects at the location is then updated (step 220), and if the location is then full (step 222), the system identifies that the location is ready for further processing (step 226). If not, the system then determines whether (based on prior knowledge and/or heuristics), whether the location is likely to receive a further object (step 224). If so, the system identifies that the location is ready for further processing (step 226). If not, the system returns to receiving a new object (step 202). The further processing may, for example include collecting the items at the location in a single bag for transport to a shipping location.

In accordance with a specific embodiment, the invention provides a user interface that conveys all relevant information to operators, management, and maintenance personnel. In a specific embodiment, this may include lights indicating bins that are about to be ejected (as full), bins that are not completely properly positioned, the in-feed hopper content level, and the overall operating mode of the entire system. Additional information might include the rate of object processing and additional statistics. In a specific embodiment, the system may automatically print labels and scan labels before the operator places the packages on an output conveyor. In accordance with a further embodiment, the system may incorporate software systems that interface with the customer's databases and other information systems, to provide operational information to the customer's system, and to query the customer's system for object information.

Figure 24:
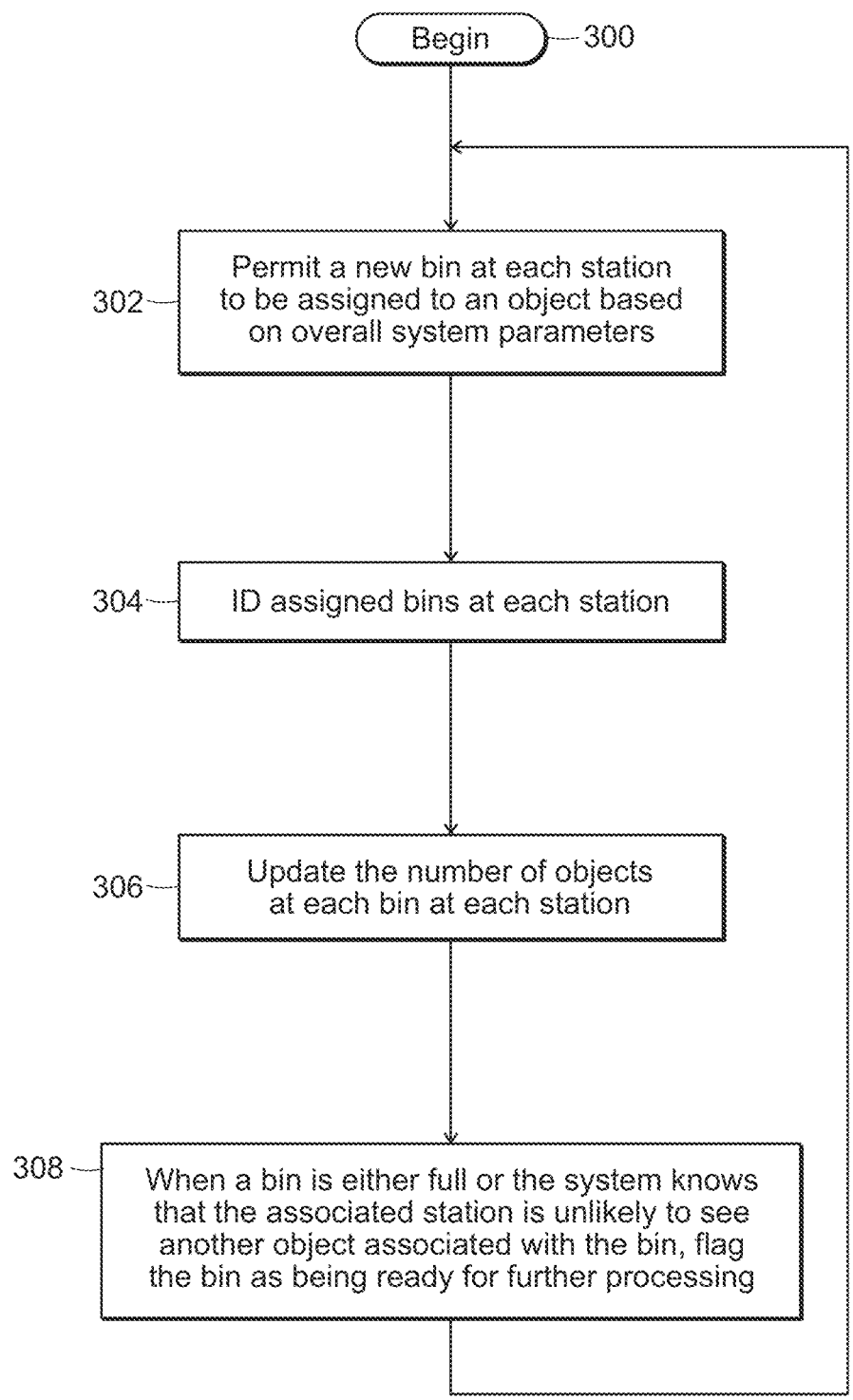
FIG. 24 shows an illustrative flowchart of an overall method of providing dynamic processing of objects.

A process of the overall control system is shown, for example, in FIG. 24. The overall control system may begin (step 300) by permitting a new collection bin at each station to be assigned to a group of objects based on overall system parameters (step 302) as discussed in more detail below. The system then identifies assigned bins correlated with objects at each station (step 304), and updates the number of objects at each bin at each station (step 306). The system then determines that when a bin is either full or the system expects that the associated sorting station is unlikely to see another object associated with the bin, the associated sorting station robotic system will then place the completed bin onto an output conveyor, or signal a human worker to come and empty the bin (step 308), and then return to step 302.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

Figure 25:
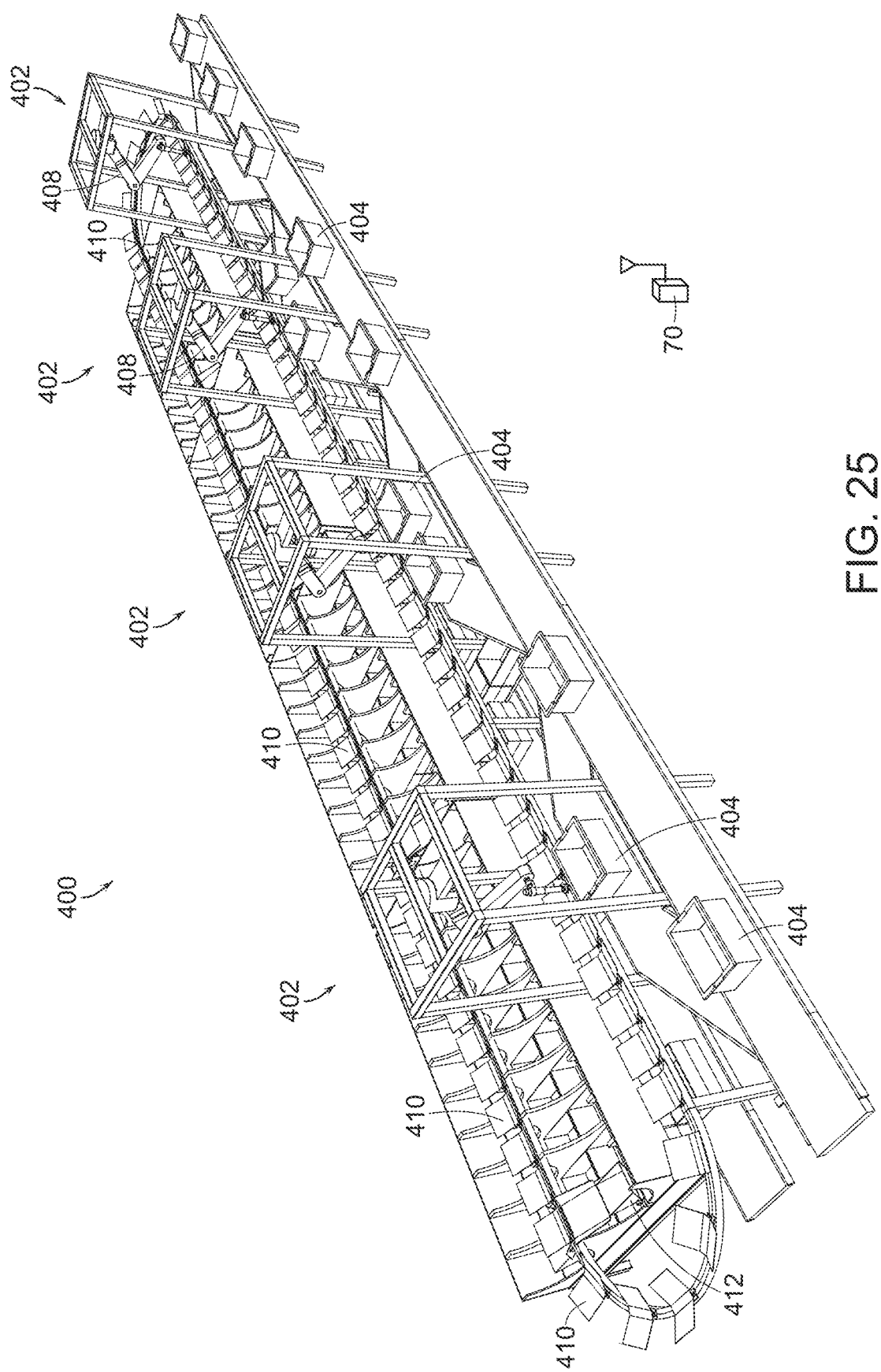
FIG. 25 shows an illustrative diagrammatic view of an object processing system in accordance with another embodiment of the present invention that includes a plurality of processing stations.

In accordance with further embodiments, the invention may provide a full system 400 as shown in FIG. 25 that includes processing stations 402 that service input bins 404 an input conveyor 406 and include programmable motion devices 408 to provide selected objects onto tilt trays 410 that travel among destination bins 414. The tilt trays 410 drop objects into reciprocal carriages 412, that then ferry the objects to selected destination bins 414, and themselves tilt to drop each object into a selected bin.

Figure 26:
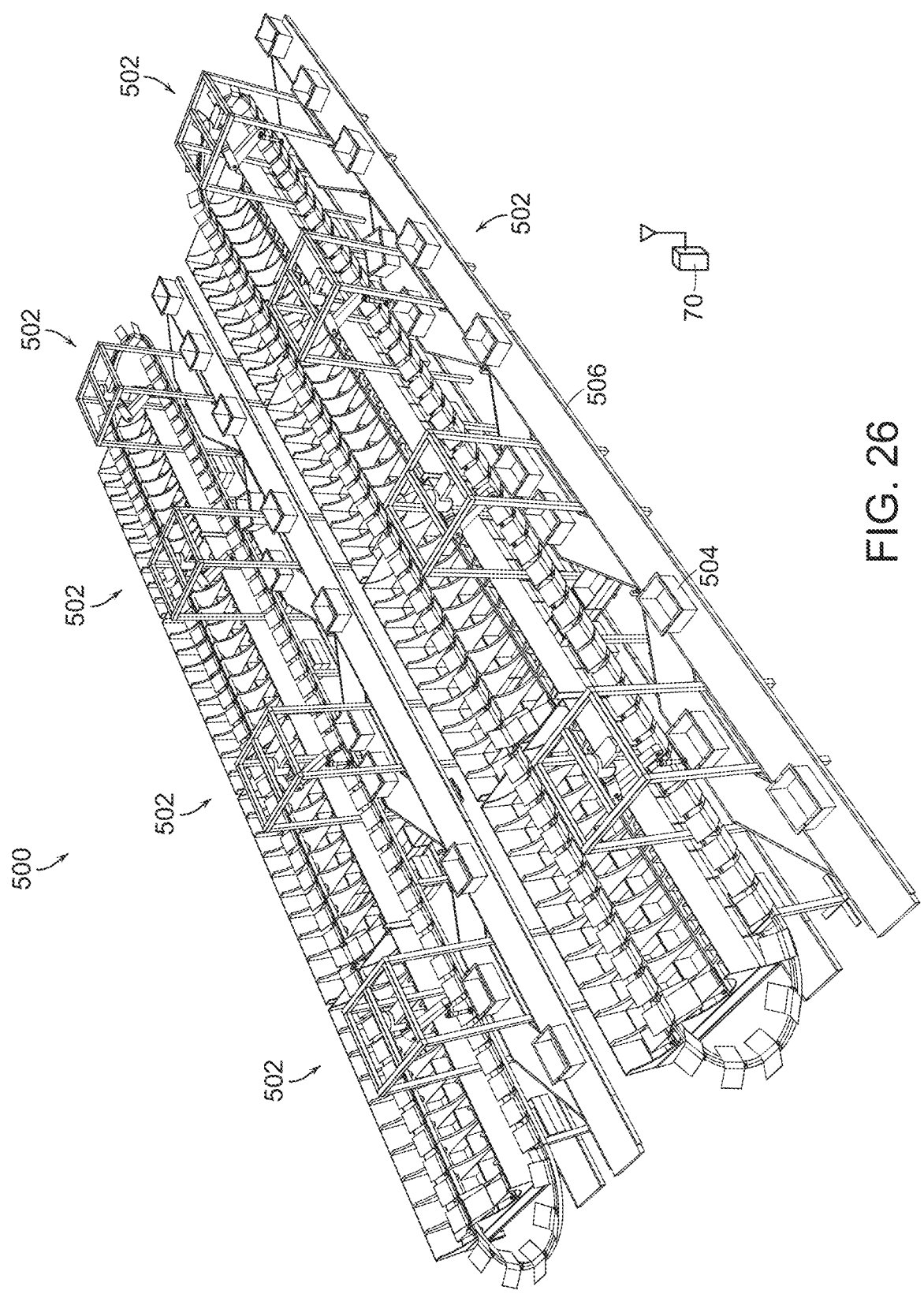
FIG. 26 shows an illustrative diagrammatic view of an object processing system in accordance with a further embodiment of the present invention that includes a plurality of processing stations that access a plurality of input bins via a common input conveyor.

Systems of the invention are highly scalable in terms of sorts-per-hour as well as the number of storage bins and destination bins that may be available. FIG. 26 shows a system 500 in accordance with a further embodiment of the present invention that includes plurality of processing sections 502 that access a plurality of input bins 504 via a common input conveyor 506, and provide objects from the input bins 504 to destination containers 514 as discussed above. Generally, each processing section 502 includes a programmable motion device 508 that provides objects to a tilt tray 516 and then to a shuttle carrier 512 of one or more processing sections. Supply bins 504 are provided on the input conveyor 506, and destination bins 514 are provided on removable drawers and are accessible by shuttle carriers 514.

Figure 27:
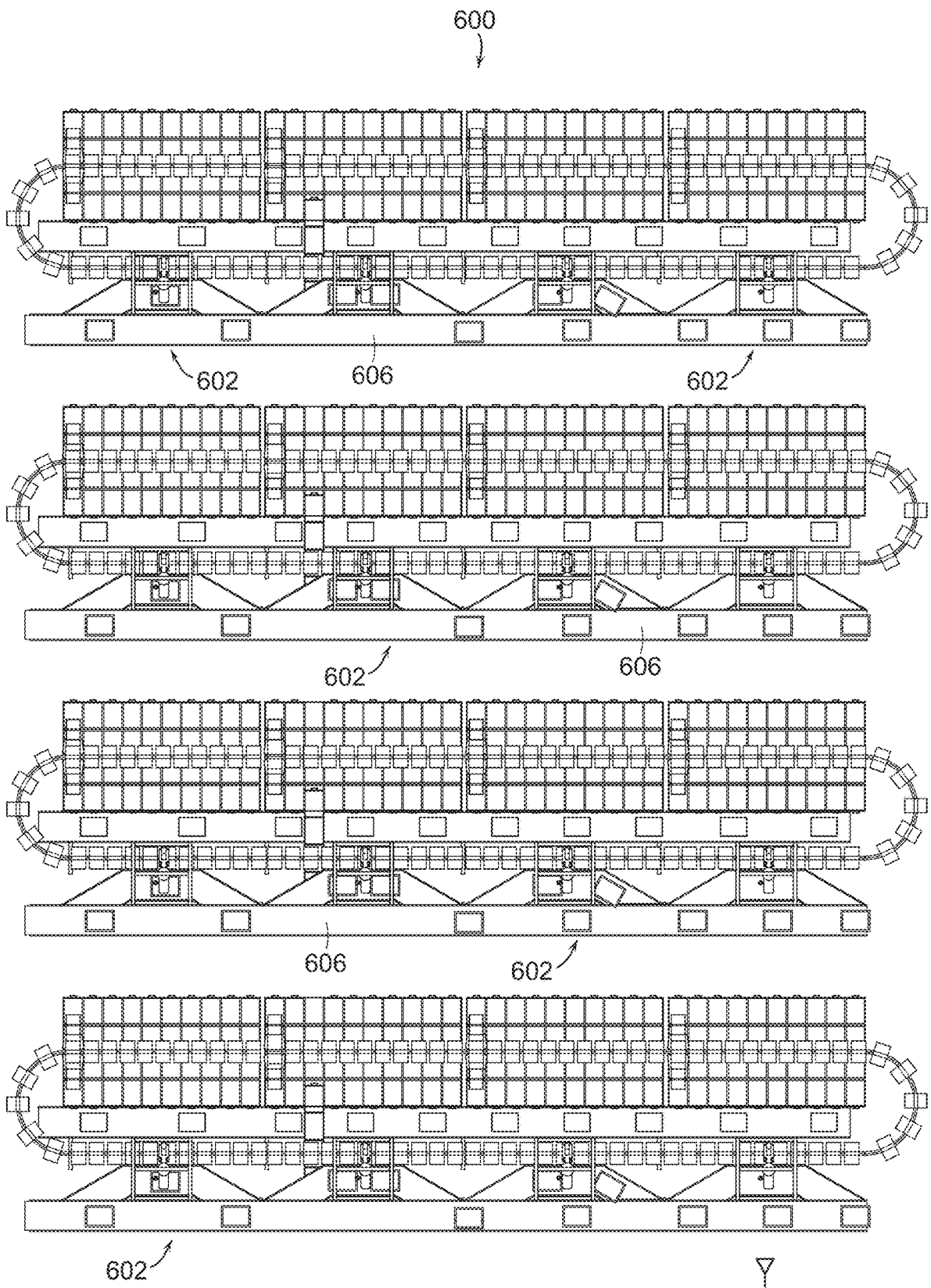
FIG. 27 shows an illustrative diagrammatic view of an object processing system in accordance with a further embodiment of the present invention that includes a further plurality of rows of sets of processing stations that access a plurality of input conveyors.

FIG. 27 shows a system 600 in accordance with a further embodiment of the present invention that includes a further plurality many row of sets of processing sections 602 that access one of a plurality of input conveyors 606, and process objects to be placed in any of a variety of destination bins via a plurality of programmable motion devices and a plurality of tilt trays, and a plurality of shuttle carriers that bring objects to desired destinations bins.

Control of each of the systems 30, 400, 500 and 600 may be provided by the computer system 70 that is in communication with the storage conveyors and displacement mechanism(s), the processing conveyors and displacement mechanism(s), and the programmable motion device(s). The computer system 70 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modifications and variations may be made to the above disclosed embodiments without departing from the spirit and scope of the present invention.

What is claimed is:

1. A method of processing objects using a programmable motion device, said method comprising:
    perceiving identifying indicia representative of an identity of an object of a plurality of objects at an input area;
    acquiring the object from the plurality of objects at the input area using an end effector of the programmable motion device, wherein the programmable motion device is adapted for assisting in the delivery of the object to an identified processing location, said identified processing location being associated with the identifying indicia and said identified processing location being provided as one of a plurality of processing locations;
    moving the object using the programmable motion device onto a carrier of a plurality of carriers that travel in a continuous loop;
    moving the carrier with the object along a loop direction of the continuous loop;
    dropping the object from the carrier into a carriage that travels reciprocally in a first direction and in a second direction that is opposite the first direction adjacent the plurality of processing locations; and
    dropping the object from the carriage into the identified processing location of the plurality of processing locations.

2. The method of claim 1, wherein the perceiving identifying indicia occurs prior to grasping the object.

3. The method of claim 1, wherein the input area is provided on an input area conveyor that is coupled to a primary input conveyor.

4. The method of claim 3, wherein the primary input conveyor is connected to a plurality of further input areas each of which is adjacent a further programmable motion device.

5. The method of claim 4, wherein the plurality of further programmable motion devices are adjacent the continuous loop on which the plurality of carriers are moved.

6. The method of claim 1, wherein the plurality of objects at the input area is provided in a bin that is one of a plurality of bins, each including a further plurality of objects.

7. The method of claim 1, wherein the carrier is actuatable to tip to drop the object from the carrier into the carriage.

8. The method of claim 1, where in the carriage is actuatable to tip to drop the object from the carriage into the identified processing location of the plurality of processing locations.

9. The method of claim 8, wherein the carriage is actuatable to tip in either of two mutually opposing directions.

10. The method of claim 1, wherein the method further includes removing a drawer with the identified processing location and at least one other processing location when the identified processing location is any of full or otherwise finished being processed.

11. A method of processing objects using a programmable motion device, said method comprising:
    perceiving identifying indicia representative of an identity of an object of a plurality of objects at an input area;
    acquiring the object from the plurality of objects at the input area using an end effector of the programmable motion device, wherein the programmable motion device is adapted for assisting in the delivery of the object to an identified processing location, said identified processing location being associated with the identifying indicia and said identified processing location being provided as one of a plurality of processing locations;

moving the object using the programmable motion device onto a carrier of a plurality of carriers that travel in a continuous loop;

moving the carrier with the object along the continuous loop until the object is to be discharged into a selected carriage of a plurality of carriages, wherein the selected carriage of the plurality of carriages moves reciprocally adjacent the plurality of processing locations;

dropping the object from the carrier into the selected carriage;

moving the selected carriage adjacent the plurality of processing locations; and dropping the object from the carriage into the identified processing location of the plurality of processing locations.

12. The method of claim 11, wherein the perceiving identifying indicia occurs prior to grasping the object.

13. The method of claim 11, wherein the input area is provided on an input area conveyor that is coupled to a primary input conveyor.

14. The method of claim 13, wherein the primary input conveyor is connected to a plurality of further input areas each of which is adjacent a further programmable motion device.

15. The method of claim 14, wherein the plurality of further programmable motion devices are adjacent the continuous loop on which the plurality of carriers are moved.

16. The method of claim 11, wherein the plurality of objects at the input area is provided in a bin that is one of a plurality of bins, each including a further plurality of objects.

17. The method of claim 16, wherein the carriage is actuatable to tip in either of two mutually opposing directions.

18. The method of claim 11, wherein the carrier is actuatable to tip to drop the object from the carrier into the carriage.

19. The method of claim 11, where in the carriage is actuatable to tip to drop the object from the carriage into the identified processing location of the plurality of processing locations.

20. The method of claim 11, wherein the method further includes removing a drawer with the identified processing location and at least one other processing location when the identified processing location is any of full or otherwise finished being processed.

21. An object processing system comprising:
a perception system for perceiving identifying indicia representative of an identity of an object of a plurality of objects at an input area;

a programmable motion device including an end-effector for acquiring the object from the plurality of objects at the input area, wherein the programmable motion device is adapted for assisting in the delivery of the object to an identified processing location, said identified processing location being associated with the identifying indicia and said identified processing location being provided as one of a plurality of processing locations;

a carrier for receiving the object from the programmable motion device, said carrier being one of a plurality of carriers that travel in a continuous loop that includes a loop direction of the continuous loop; and a carriage for receiving the object from the carrier, the carriage being adapted to travel reciprocally in a first direction and in a second direction that is opposite the first direction adjacent the plurality of processing locations.

22. The object processing system of claim 21, wherein the input area is provided on an input conveyor that is coupled to a primary input conveyor.

23. The object processing system of claim 22, wherein the primary input conveyor is connected to a plurality of further input areas each of which is adjacent a further programmable motion device.

24. The object processing system of claim 23, wherein the plurality of further programmable motion devices are adjacent the continuous loop on which the plurality of carriers are moved.

25. The object processing system of claim 21, wherein the plurality of objects at the input area is provided in a bin that is one of a plurality of bins, each including a further plurality of objects.

26. The object processing system of claim 21, wherein the carrier is actuatable to tip to drop the object from the carrier into the carriage.

27. The object processing system of claim 21, where in the carriage is actuatable to tip to drop the object from the carriage into the identified processing location of the plurality of processing locations.

28. The object processing system of claim 27, wherein the carriage is actuatable to tip in either of two mutually opposing directions.

29. The object processing system of claim 21, wherein the system further includes a removable drawer that includes the identified processing location and at least one other processing location.

\* \* \* \* \*